(12) United States Patent
Wagner

(10) Patent No.: US 12,468,988 B2
(45) Date of Patent: Nov. 11, 2025

(54) ELECTRONIC LEDGER TICKETING SYSTEMS AND PLATFORMS

(71) Applicant: Vivid Seats LLC, Chicago, IL (US)

(72) Inventor: Jonathan M. Wagner, Audubon, PA (US)

(73) Assignee: Vivid Seats LLC, Chicago, IL (US)

(*) Notice: Subject to any disclaimer, the term of this patent is extended or adjusted under 35 U.S.C. 154(b) by 0 days.

(21) Appl. No.: 18/828,924

(22) Filed: Sep. 9, 2024

(65) Prior Publication Data

US 2024/0428146 A1    Dec. 26, 2024

Related U.S. Application Data

(63) Continuation-in-part of application No. 18/108,548, filed on Feb. 10, 2023, and a continuation-in-part of application No. 17/968,716, filed on Oct. 18, 2022, and a continuation-in-part of application No. 17/532,781, filed on Nov. 22, 2021, and a continuation-in-part of application No. 17/499,784, filed on Oct. 12, 2021, and a continuation-in-part of application No. 17/480,980, filed on Sep. 21, 2021, now Pat. No. 12,105,701.

(51) Int. Cl.
*G06Q 10/02* (2012.01)
*G06Q 20/02* (2012.01)

(52) U.S. Cl.
CPC ............ *G06Q 10/02* (2013.01); *G06Q 20/02* (2013.01)

(58) Field of Classification Search
CPC ................................. G06Q 10/02; G06Q 20/02
See application file for complete search history.

(56) References Cited

U.S. PATENT DOCUMENTS 7,143,290 B1    11/2006   Ginter et al.
8,571,949 B1    10/2013   Boesjes
(Continued)

FOREIGN PATENT DOCUMENTS

WO    2021054989 A1    3/2021
WO    2021222398 A1    11/2021

OTHER PUBLICATIONS

European Search Report issued in European Application No. 23203808.3, mailed on Mar. 11, 2024, 8 pages.
(Continued)

*Primary Examiner* — George Chen
*Assistant Examiner* — Duane N. Moore
(74) *Attorney, Agent, or Firm* — Calyx Law LLP; Frank L. Gerratana

(57) ABSTRACT

Computer-implemented systems, methods, and products for enabling one or more nodes of a first electronic ledger platform to carry out operations with respect to one or more records of the first electronic ledger platform. The operations may include receiving an indication from a smart contract to manage a transaction associated with sale of a token by a selling entity; processing information associated with the sale of the token to initiate the transaction, the information including identity of a first entity listing the token for sale and identity of a second entity having record ownership of the token; verifying one or more events or information associated with the transaction to confirm authenticity or transferability of the token; and approving the transaction.

18 Claims, 12 Drawing Sheets

(56) References Cited

U.S. PATENT DOCUMENTS

| | | |
|---|---|---|
| 9,530,129 B2 | 12/2016 | Lanc |
| 10,373,138 B2 | 8/2019 | Hammad |
| 10,540,653 B1 | 1/2020 | James et al. |
| 10,855,475 B1 | 12/2020 | Leach et al. |
| 11,308,487 B1 | 4/2022 | Foster et al. |
| 11,367,071 B2 | 6/2022 | Gonzales et al. |
| 11,769,154 B1 | 9/2023 | Cash et al. |
| 12,105,701 B2 | 10/2024 | Wagner |
| 2003/0069827 A1 | 4/2003 | Gathman et al. |
| 2005/0021450 A1 | 1/2005 | Nakfoor |
| 2014/0279615 A1 | 9/2014 | Levin et al. |
| 2019/0057362 A1 | 2/2019 | Wright et al. |
| 2019/0066063 A1 | 2/2019 | Jessamine |
| 2019/0156363 A1 | 5/2019 | Postrel |
| 2019/0188653 A1 | 6/2019 | Khaund |
| 2019/0213652 A1 | 7/2019 | Sharma et al. |
| 2019/0303892 A1 | 10/2019 | Yantis et al. |
| 2019/0303920 A1 | 10/2019 | Balaraman et al. |
| 2020/0042989 A1 | 2/2020 | Ramadoss et al. |
| 2020/0065763 A1 | 2/2020 | Rosinzonsky et al. |
| 2020/0065899 A1 | 2/2020 | Fritsch et al. |
| 2020/0104836 A1 | 4/2020 | Coburn et al. |
| 2020/0250661 A1 | 8/2020 | Padmanabhan et al. |
| 2020/0327569 A1 | 10/2020 | Feng et al. |
| 2020/0351093 A1* | 11/2020 | Madhuram ........... H04L 9/0819 |
| 2020/0351657 A1 | 11/2020 | Wentz |
| 2020/0358784 A1 | 11/2020 | Khaund |
| 2020/0380825 A1 | 12/2020 | Purohit et al. |
| 2020/0394176 A1 | 12/2020 | Wu et al. |
| 2021/0133700 A1 | 5/2021 | Williams et al. |
| 2021/0158335 A1 | 5/2021 | Bollen et al. |
| 2021/0233200 A1* | 7/2021 | Meltzer ................. G06Q 50/34 |
| 2021/0248214 A1 | 8/2021 | Goldston et al. |
| 2021/0279305 A1 | 9/2021 | Goldston et al. |
| 2021/0357893 A1 | 11/2021 | Kang et al. |
| 2022/0118365 A1 | 4/2022 | Thacker et al. |
| 2022/0156725 A1 | 5/2022 | Iwama et al. |
| 2022/0156727 A1 | 5/2022 | Yan |
| 2022/0198418 A1 | 6/2022 | Kang et al. |
| 2022/0253836 A1 | 8/2022 | Russell et al. |
| 2022/0277234 A1 | 9/2022 | Uhr et al. |
| 2022/0277301 A1 | 9/2022 | Gonzales et al. |
| 2023/0068301 A1 | 3/2023 | Callonnec et al. |
| 2023/0080808 A1 | 3/2023 | Padmanabhan |
| 2023/0092200 A1 | 3/2023 | Wagner |
| 2023/0116613 A1 | 4/2023 | Wagner |
| 2023/0120534 A1 | 4/2023 | Jakobsson et al. |
| 2023/0162202 A1 | 5/2023 | Wagner |
| 2023/0177167 A1 | 6/2023 | Chan et al. |
| 2024/0127201 A1 | 4/2024 | Wagner |
| 2024/0273529 A1 | 8/2024 | Wagner |

OTHER PUBLICATIONS

Cha et al., "A Blockchain-Based Privacy Preserving Ticketing Service", IEEE Global Conference on Consumer Electronics (GCCE), 2018, 2378-8143.

Le et al., "Implementation of a Blockchain-Based Event Reselling System", 6th International Conference on Computational Science/Intelligence and Applied Informatics (CSII), 2019, 50-55.

Lin et al., "A Smart Contract-Based Mobile Ticketing System with Multi-Signature and blockchain", IEEE Global Conference on Consumer Electronics (GCCE), Oct. 15, 2019, pp. 231-232.

Marksteiner,"Smart Ticket Protection: An Architecture for Cyber-Protecting Physical Tickets Using Digitally Signed Random Pattern Markers", IEEE Conference on Commerce and Enterprise Computing, 2018, 5 Pages.

Tackmann,"Secure Event Tickets on a Blockchain", Data Privacy Management Cryptocurrencies and Blockchain Technology, 2017, 437-444 Pages.

Regner et al. (2019) "NFTs in Practice—Non-Fungible Tokens as Core Component of a Blockchain-Based Event Ticketing Application", Fortieth International Conference on Information Systems, 17 Pages.

* cited by examiner

ELECTRONIC LEDGER TICKETING SYSTEMS AND PLATFORMS

CROSS-REFERENCE TO RELATED APPLICATIONS

Without limitation, this Application claims priority to and is a continuation-in-part of U.S. patent application Ser. No. 17/480,980, filed on Sep. 21, 2021, the content of which is hereby incorporated by reference herein in entirety. This Application further claims priority to and is a continuation-in-part of U.S. patent application Ser. No. 18/108,548, filed on Feb. 10, 2023, U.S. patent application Ser. No. 17/968,716, filed on Oct. 18, 2022, U.S. patent application Ser. No. 17/532,781, filed on Nov. 22, 2021, U.S. patent application Ser. No. 17/499,784, filed on Oct. 12, 2021, the contents of which are hereby incorporated herein in their entirety.

TECHNICAL FIELD

The disclosed subject matter generally relates to electronic ticketing systems and corresponding computer-implemented platforms, methods, and media.

BACKGROUND

An electronic ledger, such as a blockchain, can be used to record ownership of assets and enable authorized entities to carry out transactions using electronic tokens associated with those assets. For example, a token, which in itself can be a type of electronic asset, may be transferred among entities by issuing transactions recorded on a blockchain.

In many blockchain-based systems, there is a delay between when a transaction is issued (e.g., initiated) and when the transaction is incorporated (e.g., committed) into blockchain records or nodes. A ticket for attending a concert is a type of asset that may be represented by an electronic token transacted on a blockchain. The token can be transferred among entities by transactions that are electronically recorded on the blockchain.

Disadvantageously, validation of electronic transactions can be cumbersome, inefficient, and error-prone depending on access permissions to the electronic ledger and the number of electronic ledgers involved. The associated verification processes are also challenging particularly when the content rights management system controlling the ownership rights is not integrated or compatible with the monetary transaction system that processes the electronic transactions.

Moreover, in many electronic ledger platforms, the originator of a transaction has limited to no control over the downstream transactions and cannot participate as a beneficiary of such downstream transactions. Nor can the originator or other reseller use recorded transaction information about the downstream token exchanges in a meaningful way.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Among other things, we describe implementations of a method of enabling one or more nodes of an electronic ledger platform to carry out operations with respect to one or more records in the electronic ledger platform. The operations include receiving an indication to exchange a first token of a first type with a second token of a second type, the indication being authorized by a first entity. The first token may be associated with ownership information and include activity information. For example, the ownership information may indicate that the first token is owned by the first entity and the activity information may indicate a first activity. The ownership of the first token may be transferable to other entities over the electronic ledger platform based on the ownership information associated with the first token.

The second token may be generated, in response to the receiving of the indication. In some embodiments, the second token is associated with the ownership information and comprises admission information. The ownership information can indicate that the second token is owned by the first entity and the admission information can indicate admission to the first activity. In certain embodiments, generation of the second token is committed to one or more records on at least one of a legacy system or an electronic ledger in the electronic ledger platform in accordance with a first protocol.

An indication may be received, as authorized by a selling entity, to transfer a token to a buying entity. In one or more aspects, the indication refers to a first quantity of cryptocurrency to be provided by the buying entity. The token may include a record of a second quantity of cryptocurrency provided to one or more other entities by the buying entity or the selling entity and a reference to an executable program. In response to execution of the executable program, one or more records of an electronic ledger in the electronic ledger platform are committed in accordance with a certain protocol. The committed records include references to one or more of the transfer of the token to the buying entity and transfer of a first portion of the first quantity of the cryptocurrency to a third entity. The first portion can be determined based on the first quantity and the second quantity. A second portion of the first quantity of the cryptocurrency may be transferred to the selling entity.

In at least one embodiment, an electronic ledger platform is provided for processing electronic tokens that are transferable between multiple entities, such as a first entity, a second entity, and a third entity. The electronic ledger platform includes an issuing system to write a demand token to one or more blocks of an electronic ledger in the electronic ledger platform. The demand token includes or references ownership information and activity information. The ownership information indicates that the demand token is owned by the second entity, while the activity information indicates an event to which the second entity is admissible.

In certain implementations, the second entity converts the demand token to an admission token. Ownership of the demand token is transferrable from the second entity to the third entity over the electronic ledger platform according to a first protocol. However, ownership of the admission token is not transferable from the second entity to the third entity over the electronic according to the first protocol. The electronic ledger platform may further include an admission system responsible for converting the demand token to the admission token upon receiving an authenticated request from the second entity. The admission token can be redeemable at the time of entry to the event in accordance with a second protocol.

In accordance with one or more aspects, the first protocol requires scrutiny at a higher level of confidence than the second protocol. The electronic ledger platform further includes a transaction system to transfer the demand token from the second entity to third entity in exchange for a specified quantity of currency. The specified quantity of currency is provided from the second entity to the third entity. The demand token includes a reference to an executable program that is executed to commit one or more blocks of the electronic ledger, including at least a reference to the transfer of the demand token to the third entity.

In some variations, one or more of the features disclosed herein including the following features can optionally be included in any feasible arrangement or combination. For example, when executed the executable program can further commit to one or more blocks of the electronic ledger at least a reference to a transfer of a first portion of the first quantity of the currency to the first entity. The first portion is determined based on the first quantity and a second quantity. The second quantity can represent value paid by the second entity to the first entity in exchange for the demand token. The electronic ledger platform can be further configured to transfer a second portion of the first quantity of the currency to the second entity.

In at least on embodiment, the first protocol is configured to verify the ownership information associated with the demand token and validate transactions for the transfer of the demand token over the electronic ledger. The second protocol can be further configured to redeem the admission token independent of the first protocol configured for verifying the ownership information associated with the demand token.

The demand token can further comprise a third quantity of currency configured to be provided to the first entity upon an initial transfer of the demand token. The exchange for a first quantity of currency can be authorized by the third entity. Further, the first portion can be determined based on a percentage of a difference between the second quantity and the first quantity. The third entity can determine a value associated with the percentage or with the first portion.

In one example embodiment, the transfer of the demand token to the third entity is committed in a first record of the electronic ledger. The transfer of the first portion of the first quantity of the currency to the first entity can also be committed in a second record of the electronic ledger. The transfer of the demand token to the third entity and the transfer of the first portion of the first quantity of the currency to the first entity can be committed in a first record of the electronic ledger.

Depending on implementation, in response to determining that a difference between the second quantity and the first quantity is less than a predetermined threshold, a value of the first portion can be zero, for example. Further, in response to determining that a difference between the second quantity and the first quantity is less than a second predetermined threshold, the value of the first portion can also be less than or equal to a first threshold.

In some variations, the authenticated request can further include a set of verifiable qualifications associated with the second entity. In response to execution of the executable program, the transaction system can commit an indication to one or more records of the electronic ledger. The indication can indicate the transfer of the demand token from the second entity to the third entity in exchange for a first currency in response to determining the second entity is qualified for the ownership of the demand token based on an evaluation of the set of verifiable qualifications and the set of restrictions.

In one or more embodiments, a first amount of currency corresponding to the first value is transferred to the second entity. The indication can also indicate the transfer of the demand token from the second entity to the third entity in exchange for the first currency corresponding to a second value higher than the first value in response to determining the third entity is not qualified for the ownership of the demand token based on the evaluation of a set of verifiable qualifications and the set of restrictions. A second amount of currency corresponding to a first portion of the second value is transferred to the second entity and a third amount of currency corresponding to a second portion of the second value is transferred to a fourth entity. The indication can further indicate the transfer of the demand token was unsuccessful, in response to determining the third entity is not qualified for the ownership of the token based on the evaluation of the set of verifiable qualifications and the set of restrictions.

In one example, the transaction system can confirm the transfer of the demand token from the second entity to the third entity by verifying one or more events or information associated with purchase of the demand token by the third entity from the second entity. In certain implementations, after receiving an indication from a smart contract to manage the transaction, the transaction system can be configured to process information associated with the same of the demand token to initiate the transaction. The information can include the identity of the second entity listing the token for sale and the identity of the third entity having record ownership of the token. The transaction system can be configured to verify one or more events or information associated with the transaction to confirm authenticity or transferability of the demand token and approve the transaction.

[FROM 503 SUMMARY] In certain embodiments, one or more nodes of an electronic ledger platform are configured receive an indication authorized by a first entity (e.g., a selling entity) to transfer ownership rights in a token to a second entity (e.g., a buying entity). The indication may include a set of verifiable qualifications associated with the second entity and the token may include a record of a first value associated with the token. A set of restrictions or a reference to an executable program (e.g., a smart contract) may be associated with the token.

In response to execution of the executable program, certain data or metadata is stored or committed to one or more records of an electronic ledger in the electronic ledger platform. The data or metadata may include a reference to the transfer of the token to the second entity in exchange for currency corresponding to the first value, in response to determining that the second entity is qualified for the ownership of the token based on an evaluation of the set of verifiable qualifications and the set of restrictions.

In one example embodiment, a first amount of currency corresponding to the first value is transferred to the first entity. In response to determining that the second entity is not qualified for the ownership of the token based on the evaluation of the set of verifiable qualifications and the set of restrictions, the data or metadata references the transfer of the token to the second entity in exchange for currency corresponding to a second value higher than the first value. In one example, a second amount of currency corresponding to a first portion of the second value is transferred to the first entity and a third amount of currency corresponding to a second portion of the second value is transferred to a third entity (e.g., issuing entity).

In certain aspects, the data or metadata provides an indication that the transfer of the token was unsuccessful, in response to determining that the second entity is not qualified for the ownership of the token based on the evaluation of the set of verifiable qualifications and the set of restrictions. In this example, the executable program may fail to write a record of the subject transaction to the electronic ledger. The rejection of the transaction may contain an error code that is recorded on the electronic ledger to indicate the failure of transfer of the token due to restrictions attached to or associated with the token at the time of issuance or a later time. The restrictions can include limitations on ownership, privileges, or the transfer price for a ticket offered for sale.

An electronic token for a ticket may be initially issued for sale with metadata embedded in or otherwise associated with the token. The metadata can be evaluated by a smart contract, for example, to determine whether certain restrictions are associated with the token. The restrictions may indicate, for example, that the issued token is non-transferable, or that it is transferable only to a certain group of purchasers. The restrictions can also be used to set the sales price for a ticket based on the identity of the purchaser.

In an example implementation, a restriction attached to a token indicates that, if the token is transferred to an unqualified purchaser, the sales price for the ticket will be at a higher sales price. If the token is transferred to an unqualified purchaser, then a smart contract executing the transfer may either block the transfer, restrict the transfer, or modify the sales price. The transfer in such a scenario may result in a portion of the sales price paid by the unqualified purchaser to be transferred to an original issuer of the token (or other seller in the upstream chain of commerce).

One or more nodes of an electronic ledger platform may be configured to carry out operations with respect to one or more records of the electronic ledger platform, where the operations comprise receiving an indication authorized by a first entity to transfer ownership rights in a token to a second entity, the indication comprising a set of verifiable qualifications associated with the second entity, the token comprising a record of at least a first value associated with the token, a record of at least a set of restrictions associated with the token, and a reference to an executable program.

In response to determining that the second entity is not qualified for the ownership of the token (e.g., based on the evaluation of the set of verifiable qualifications and the set of restrictions), either nothing is committed to the one or more records of an electronic ledger, or an indication or error code is committed that indicates the transfer of the token was unsuccessful. Other implementations are also possible, depending on the nature and programming configurations of the blockchain or smart contracts being utilized.

[FROM 504 SUMMARY] In certain implementations, systems and methods for electronic ticketing validation and fulfillment are provided. The process may include monitoring and verifying one or more events or transfer instruments that confirm or support the transfer (or initiation of the transfer) of an electronic ticket to a purchaser. The validation is performed, preferably, virtually simultaneously or before the seller gets paid for the ticket sold.

To accomplish the validation and fulfillment, one or more nodes of an electronic ledger platform are enabled to carry out operations with respect to records of the electronic ledger platform. The operations include receiving an indication from a smart contract to manage a transaction associated with purchase of an electronic ticket by a purchasing entity from a selling entity. Financial information associated with the purchase of the token are processed to initiate the transaction. The financial information, for example, includes a value associated with the token, a source of funds for the purchase, and a destination account for transfer of currency.

Depending on implementation, one or more events or information (e.g., delivery instruments) associated with the ticket are verified to confirm the transfer of the token from the selling entity to the purchasing entity. An indication may be provided as authorized by a selling entity to transfer ownership rights in a token to a purchasing entity. The indication may include a set of verifiable qualifications associated with the purchasing entity and the token may include a record of a first value associated with the token.

In at least some aspects, in response to execution of the smart contract, information about the ownership rights to the token are updated. The information about ownership rights may be committed to one or more records of at least one or more of a first electronic ledger associate with the first electronic ledger platform utilized for managing the exchange of consideration paid for the transaction, and a second electronic ledger associate with a content rights management system utilized for managing the ownership rights to the token.

The transaction is completed when the first value is transferred from the source of funds to the destination account, in response to a witness entity verifying the information associate with the transaction or the occurrence of the one or more events. The information associated with the transaction may include a delivery instrument, a proof of delivery, or a proof of initiation of shipment. The one or more events may, for example, include at least one of initiation of transfer of the ownership rights in the token to the purchasing entity, delivery of the token to the purchasing entity, or an attempt for delivery of the token by the selling entity.

In accordance with one or more embodiments, the first electronic ledger platform is not integrated with the second electronic ledger platform. That is, the first electronic ledger platform may be implemented such that it is unable to directly make changes to data recorded in one or more records of the second electronic ledger.

[FROM 505 SUMMARY] In some example implementations, systems and methods for verification of transferability and authenticity of an electronic ticket or token are provided. The process may include receiving an indication from a smart contract to manage a transaction associated with sale of a token by a selling entity, processing information associated with the sale of the token to initiate the transaction, the information including identity of a first entity listing the token for sale and identity of a second entity having record ownership of the token, and verifying one or more events or information associated with the transaction to confirm authenticity or transferability of the token; and approving the transaction.

The confirming of the authenticity or transferability of the token may include confirming that the first entity and the second entity are the same. In one or more aspects, in response to successfully verifying at least one or more of the authenticity or transferability of the token, the smart contract is executed to update information about the ownership rights to the token. Information about ownership rights is committed to one or more records of at least one or more of a first electronic ledger associated with the first electronic ledger platform utilized for managing the exchange of consideration paid for the transaction, or a second electronic ledger associated with a second electronic ledger platform utilized for managing the ownership rights to the token.

In some embodiments, the first electronic ledger platform is not integrated with the second electronic ledger platform such that it is unable to directly make changes to data recorded in one or more records of the second electronic ledger. The transaction may be verified, in response to a witness entity verifying one or more of the authenticity or the transferability of the token. Information associated with verifying the authenticity or the transferability of the token, in certain implementations, includes at least one electronically verifiable ID tokens associated with the selling entity. Further, information associated with verifying the authenticity or the transferability of the token may include a first score that represents a level of authenticity or reliability for the selling entity.

Implementations of the current subject matter may include, without limitation, systems and methods consistent with the above methodology and processes, including one or more features and articles that comprise at least one tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

Figure 1A:
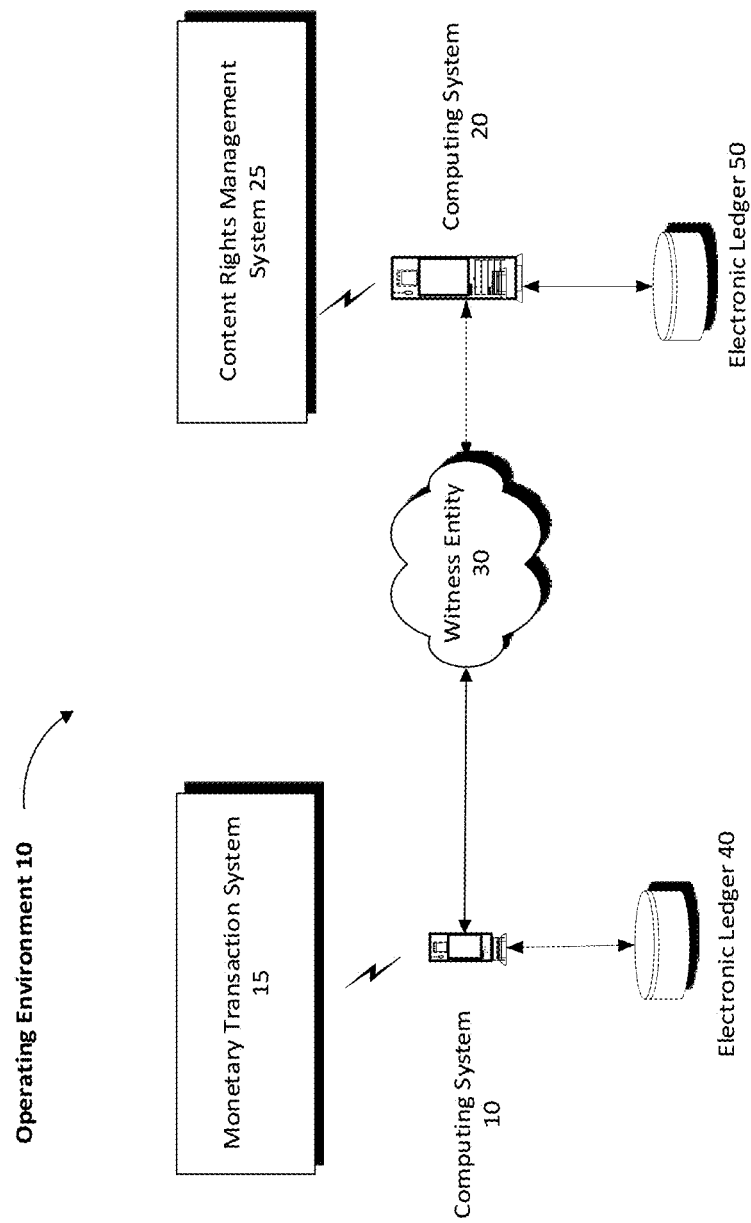
FIG. 1A is a block diagram of an operating environment for electronic ticketing validation and verification, in accordance with certain embodiments.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more examples or embodiments.

DETAILED DESCRIPTION OF EXAMPLE IMPLEMENTATIONS

Certain types of blockchain-based transactions are carried out quickly and securely using a pair of token types, such that one type of token (which is transferable over the blockchain) is exchanged with another type of token (which is non-transferable over the blockchain). The token exchange may be carried out prior to a time-sensitive event that requires a blockchain transaction to be carried out quickly.

A first token type (sometimes referred to as a "demand token") may be used to manage the transfer of ownership rights to an asset (e.g., an event ticket) on a blockchain. The demand token is transferable over the blockchain and is used to accommodate, monitor, record and possibly control a change of ownership between multiple parties. Processing and validating a transaction using the demand token over the blockchain platform can take a certain amount of time. This is because the protocols associated with the validation requirements are deliberately complex to ensure a secure and authentic transfer before the transaction is committed to the blockchain.

For example, several seconds or minutes may elapse between the time a transaction is issued to a blockchain platform and when the transaction appears in a block as recognized by a threshold number (e.g., majority) of nodes verifying the transaction. For some real-world applications, the delay associated with the verifying and committing a blockchain transaction is impractical. More particularly, in a scenario in which a demand token is to be used to gain admission to an event, the owner of the demand token may not want to wait several minutes, until the demand token is processed, validated, and committed to the blockchain. In other words, a blockchain platform can be slow to process thousands of demand token transactions at the time of admission.

To avoid an undesirable delay in time-sensitive transactions, a second token type (sometimes referred to as an "admission token") may be used to manage the admission of the owner of the demand token in an efficient manner. In at least one embodiment, the demand token is exchanged for the admission token prior to admission (e.g., while an attendee is in transit to the event or waiting in line for the event). An admission token can be processed faster than the demand token because the processing of the admission token does not require verifying and committing the transaction over the blockchain as provided in further detail herein and below.

The right of admission to a venue, such as a live concert, a theme park, or a movie theatre, has traditionally been reserved by way of an individual purchasing a physical ticket and presenting it at the time of entry to the event. With the advent of electronic ticketing technology, it has become possible to purchase an admission ticket (e.g., an e-ticket)

from, for example, an online merchant. Thus, consumers can now present a digital version of a ticket instead of the traditional physical version to gain admission.

Tickets, whether electronic or otherwise, represent the attendance rights to an event and can be bought and sold through multiple commercial streams. Typically, a primary ticketing agency is chosen by an event producer or a content rights holder to manage the initial ticket sales. Thereafter, attendance rights held in the form of physical or digital tickets can generally be freely gifted, transferred, or sold by private or professional resellers at a secondary marketplace, either in person or online.

Ticket brokers and resellers (e.g., downstream resellers), especially those in the live events industry, often buy tickets at an initial sale price (e.g., face value) with the hope and expectation of making a profit by selling the tickets at a premium later. Usually, the downstream sales do not require the reseller to pay a commission to the event producer or the primary ticketing agency. Even if such arrangement exists, enforcing it is rather difficult or impossible. Thus, a reseller gets to keep the net proceeds from a downstream sale. In certain circumstances, exertion of some control in the resale market has been desirable by the primary ticketing agency in order to avoid fraudulent transfers or to prevent activities leading to the creation of a gray or black resale market.

Traditionally, the conventional ticketing systems maintain zero or very little control over the downstream ticket exchanges, or the price and mechanism for admission. This is because, after a ticket is exchanged, an earlier-in-time seller cannot meaningfully determine or control the activities of a later-in-time seller in the resale marketplace. In particular, the current ticketing systems are generally incapable of accurately monitoring the rightful ownership or the sale price of a ticket in downstream commerce.

Of particular concern is also the notion that electronic ticketing systems and digital tickets can be susceptible to manipulation by unscrupulous actors or resellers, where fraudulently issued or sold tickets can result in unlawful or duplicate admission to an event. As such, maintaining the integrity of an electronic ticketing system and the proper authentication of electronic tickets is of utmost importance.

Further, currently available ticketing and verification technologies are generally not adequately secure. In particular, currently available blockchain-based admission and verification technologies are slow and inefficient when verifying, admitting, and recording the use of a ticket in that significant delays may be experienced during the admission or verification process. Certain venues have thousands of attendees. Using the conventional technologies, admission to a large venue can be hindered by a computational bottleneck effect due to, for example, a lengthy e-ticket verification process. The above shortcomings can adversely affect ticket sales, profit margins, and consumer satisfaction. It is desirable to improve the speed of admission without compromising the ticket verification process or the safety and integrity of electronic ticketing systems.

Furthermore, to the extent that the right of admission to an event and the ownership rights to a ticket for attending the same event can be bifurcated, in accordance with one or more embodiments, digital tokens are implemented and utilized such that a first token (i.e., an admission token) represents the right of admission to an event and a second token (i.e., a demand token) represents the corresponding ownership rights. The demand token, representing the ownership rights, may be transferred or exchanged in the free marketplace. The admission token, in contrast, once assigned cannot be offered for resale and needs to be reverted back to a demand token for the purpose of resale.

In certain implementations, one or more systems may be configured to issue one or more demand tokens for an event. A demand token may be registered as a written record on an electronic ledger (e.g., a distributed blockchain of connected records). The electronic ledger may be a distributed electronic ledger, a public blockchain or a private blockchain, depending on implementation. Once the demand token is registered on the electronic ledger, an immutable record remains on the electronic ledger by which the demand token may be uniquely identified. The demand token may be verified and executed by at least one system to issue an admission token. The admission token may be a uniquely identifiable token that is coupled (e.g., electronically linked), or otherwise associated with, the executed demand token.

The association between the demand token and the admission token may be recorded and verified by way of the instantiation and registration of the related records on the electronic ledger. The registered records may include ownership details related to the persons or entities who purchased or exchanged the demand token or those who requested the execution of the demand token to obtain an admission token. In certain embodiments, the electronic ledger provides an immutable digital environment which is configured to store and track the related data and metadata associated with the various transactions involving the purchase, sale and exchange of the electronic tokens.

Advantageously, the technology for verifying the authenticity of the electronic tokens may be an integral function of the electronic ledger platform, which uses multiple independent verification checkpoints to verify the authenticity of each transaction associated with an electronic token (i.e., based on a series of verifiable mathematical calculation, rules and algorithms). For example, a demand token representing the ownership rights to a ticket for attending an event may be purchased and sold or otherwise exchanged via a series of verifiable transactions recorded on the electronic ledger. Because the verification of a transaction may necessarily involve the re-verification of some or all of the prior transactions recorded on the electronic ledger, the chances for fraud are significantly reduced.

In some aspects or embodiments, the use of the electronic ledger provides for managing and verifying transactions involving ownership rights of a ticket to be performed in an inherently safe and secure transaction environment with means to identify and track the authenticity of the transactions from an initial point of sale down to the later points of sale. The tracking or monitoring of the related transactions and sales in the secondary market may be configured such that a chain of title to the demand token is preserved in the immutable records registered in the electronic ledger.

As suggested earlier, depending on the financial exchange utilized and other details involving the processing and verification of a transaction on the electronic ledger, significant resources may be required to verify each transaction. For example, processing a transaction involving Bitcoin or other type of cryptocurrency as a form of payment may take a relatively long period of time (e.g., several minutes depending on the verification protocol enforced). Such wait time is undesirable during admission to live events and is generally unacceptable to the extent that it would create long queues for admission and would likely result in consumer dissatisfaction.

In certain embodiments, to overcome the above-noted shortcoming, instead of using a single token system to provide exchange and admission capabilities for an event, a demand token and a corresponding but separate admission token are utilized. The admission token may be an executed instance of the demand token. The bifurcation between the right to "own" and the right to "attend" based on the instantiation of two separate tokens (i.e., two different types of tokens) for the same event provides for the possibility for selling or exchanging the right of admission over a secure electronic ledger. The ultimate purchaser of a demand token may then request to receive a respective admission token, when the purchaser decides to attend the event.

When an admission token is issued to the owner of the demand token, the holder of the admission token can be immediately admitted to the corresponding event. The processing of an admission token is distinguishable from the processing of a demand token. The latter would typically involve the exchange of ownership and payment verification, a process subject to authentication and verification dynamics and requirements that are complex and time consuming. Execution of the demand token results in generation of an admission token that is not subject to as strict authentication and verification requirements or protocols (e.g., recording an admission and preventing duplicate entry or a race or deadlock condition on ticket transfer) and can be therefore processed in a timely manner.

Once the demand token is executed in exchange for the issuance of a corresponding admission token, the executed demand token is effectively revoked and can no longer be used. The admission token may be a mathematical derivative of the demand token and would desirably be represented by a unique identifier so that the admission token represents a single unique ticket for the purpose of admission to an event. As such, in accordance with one or more embodiments, the admission token may be presented by the holder at the time of entry to an event. As provided in further detail below, upon verification and authentication, the holder would be provided with immediate admission to the event.

As noted earlier, because the authentication and verification of the admission token, in certain embodiments, may not require the same complexity or level of scrutiny as that required or associated with a demand token, an admission token may be verified a lot faster and without significant delay. The use of the admission token for attending an event is thus advantageous over an alternative in which the same token (i.e., the demand token) is used for enabling the exchange and the admission activities.

Thus, the admission token may be configured so that the admission token can be verified easily and in a timely fashion and to allow the holder of the corresponding ticket immediate admission to the event. Transactions involving change of ownership are not as time sensitive as transactions involving the admission of a ticket holder to an event. For that reason, a wait time may be tolerable and acceptable if the transaction can be achieved securely and with a high level of confidence using the requirements of an electronic ledger, when processing transactions involving the exchange of a demand token.

A higher level of scrutiny may be applied to processing demand tokens. For example, strict requirements or protocols may be enforced for verifying ownership rights and processing payments in association with the exchange of demand tokens. The owner of the demand token may in advance of the time of attendance submit a request for the demand token to be executed in exchange for the issuance of an admission token, which can be processed and verified in substantially less amount of time. Technical details on how the above functionality may be implemented are provided in further detail below.

Further, when there is high customer demand for tickets, supply and demand dictates that the attendance price for a ticket will be higher than the face value and the attendance price continues to increase incrementally with each downstream exchange, until the day of the event. When the difference between the attendance price and the ticket's face value becomes substantially large, an originating entity (e.g., a primary ticketing agency) will often compete with downstream resellers and may not release or offer as many tickets for sale to resellers. This results in less consumer choice and less efficiency in the markets because limiting the volume of tickets available through resellers can ultimately backfire and translate into a smaller total sales volume than otherwise expected or possible as fewer event tickets will be available to purchase by the consumers.

To help better understand and appreciate the novel aspects and the practical applications of the subject matter disclosed herein, we use the example of the right of admission to a venue which has traditionally been reserved by way of, for example, an individual purchasing a physical ticket and presenting it at the time of entry to the event. In certain circumstances, primary ticketing agencies aim to further participate in the monetary rewards of the downstream sales, particularly when they observe attendance prices at levels that exceed face values. The mechanisms that these agencies have available to do so are limited in their capabilities and harmful to the consumer experience in that they create friction for consumers to access the tickets in attending the event and/or constrict the supply of inventory.

Primary ticketing agencies have conventional ticketing systems that are incapable of accurately monitoring the sales price of a ticket in downstream commerce or the rightful ownership. Further, due to the large number of professional resellers and the varying methods of sale, sometimes the economic interests of the content rights holders, primary ticketing agencies, and professional resellers in the resale marketplaces becomes misaligned. As noted earlier, this can result in less collaboration and a less efficient ecosystem for the consumers and parties involved.

In addition, some participants are unable to integrate their systems, making it impossible to ensure the correctness of the monetary basis of all transactions. Other participants are unwilling to integrate their systems or data in order to protect proprietary sales or business information from disclosure to other parties. The resulting disconnect between these systems makes it impractical to implement multi-party contracts and to monitor resale fees accurately, efficiently, and in a timely fashion.

The above shortcomings can adversely affect availability of tickets, ticket sales, profit margins, and consumer satisfaction. It is desirable to improve downstream transaction control and provide a mechanism that allows for a share of the downstream sales to be provided to upstream sellers without compromising confidential information, the ticket verification process, and the security and integrity of the electronic ticketing system as a whole.

In accordance with one or more implementations, an electronic ledger environment configured for ticketing and admission rights management is provided in which one or more entities (e.g., an issuing system and an admission system) control and orchestrate functions and operations associated with the issuance, execution, transfer, assignment, and revocation of digital tokens. The digital tokens (e.g., a demand token and an admission token) maybe implemented or instantiated to represent certain rights to buy or sell event tickets or admission to an event or venue, and also to control or determine the number of outstanding tickets that are remaining in the hands of resellers.

Example Implementations

Referring to FIG. 1A, an example operating environment 10 for electronic ticketing verification is provided. As shown, financial transactions for the sale of an electronic token (e.g., an e-ticket) may be completed using a monetary transaction system 15. The monetary transaction system 15 may be implemented over a primary electronic platform or computing system 10 configured for processing one or more financial transactions. Independent of the monetary transaction system 15, a content rights management system 25 can be implemented, optionally, on a different electronic platform or computing system 20 to manage the content rights associated with the token.

In certain embodiments, the content rights management system 25 may use an electronic ledger 50 to manage the transfer of ownership rights to a token by recording the related ownership information in one or more blocks of the electronic ledger 50 (e.g., a content rights management blockchain). One the other hand, the monetary transaction system 15 may use a different electronic ledger 40 (e.g., a transaction blockchain) to separately manage and record the details of the financial transaction for the same token. If the content rights management system 25 and the monetary transaction system 15 do not write to the same electronic ledger, the transfer of ownership rights cannot be integrally verified or recorded.

In one example scenario, the financial transactions for the sale of a ticket are completed on monetary transaction system 15 implemented over a first computing system 10 or other computing platform communicating with a data retention system, such as electronic ledger 40. Monetary transaction system 15 may be independent of (e.g., not integrated with) a content rights management system 25. Content rights management system 25 may be implemented over a second computing system 20 or other computing platform and communicate with electronic ledger 50 that manages the related content rights.

In some implementations, one or both of the above systems (e.g., monetary transaction system 15 and content rights management system 25) may be configured over one or more distributed electronic ledgers (e.g., blockchain platforms). A content rights ledger (e.g., electronic ledger 50) may be used to manage the ownership rights and the transfer of ownership rights to a ticket by tracking or maintaining the ownerships rights and pricing data for a ticket (e.g., as recorded and stored in blocks of a blockchain).

When the content rights management system 25 and the monetary transaction system 15 are not integrated, the two systems have no way of directly communicating without an interchange system. That is, the authenticity of a token and the transferability of ownership rights in the token cannot be integrally verified or recorded by the monetary transaction system 15 at the time the payment transaction for the purchase of a ticket is processed. This is because the functionality for content rights management may be dedicated to content rights management system 25 on a different electronic ledger (e.g., electronic ledger 50) than the electronic ledger (e.g., electronic ledger 40) used to record the buying entity-selling entity transactions.

To overcome any shortcomings, in accordance with one or more embodiments, an electronic ticketing validation and fulfillment system is provided to monitor and verify that an electronic ticket or token is transferable and authentic. As provided in further detail herein, the verification may be achieved by at least one or more of (1) determining the ticket token is a valid representation of an actual ticket, (2) verifying the identity of the ticket token's current owner, and (3) confirming that the ticket is transferable. The validation may be performed, preferably, before the ticket sale transaction is completed.

As shown in FIG. 1A, a third party witness entity 30 or other functionally equivalent infrastructure (e.g., an independent computer-implemented platform) may be electronically configured to verify certain conditions, such as the authenticity of the token and/or the transferability of the token at the time of the transaction. In other words, the verification is to confirm that the token is authentic and owned by the entity that has listed the ticket or token for sale and also to confirm that the ownership rights to the token have not been compromised (e.g., by way of a prior sale).

In certain implementations, witness entity 30 is configured to act as an intermediary mechanism. Witness entity 30 may be equipped with verification instruments or have the ability to communicate with verification mechanisms (not shown in FIG. 1A). Witness entity 30 determines the identity of the selling entity (e.g., the entity that has listed the ticket for sale). In one example implementation, witness entity 30 determines the authenticity of a ticket token by reviewing a copy of the selling entity's identification instrument, such as a digital copy of a valid driver license, a validated phone number, or profile.

Depending on configuration, other indicia of authenticity may also be considered and may include, for example, an electronically verifiable ID token associated with the selling entity, or an authenticity or reliability score associated with the selling entity based on past transactions. In some aspect, authenticity may be determined by verifying the ownership of a known, unique, or specially assigned identifier, such an email address, a device identifier (e.g., an assigned ICCID or IMSI), or a communication or connection route, path, or source (e.g., a network IP address).

Witness entity 30 may be configured, for example, by way of an application programming interface (API) to verify information about transactions managed by the monetary transaction system 15 or the content rights management system 25. As provided in further detail herein, when the monetary transaction management system 25 is processing a transaction, witness entity 30 verifies certain conditions, such as a delivery instrument or the occurrence of one or more events, before the seller is paid and/or before the buyer receives the token.

In certain embodiments, an electronic token for a ticket is initially issued with metadata embedded in (or otherwise associated) with the token. The metadata can be evaluated by one or more witness entities 30 to ensure a selling entity is a legitimate content rights owner (e.g., a rightful owner of the ticket being sold at the time of the transaction). The metadata may be also evaluated by one or more witness entities 30 to determine whether the ticket token offered for sale is a valid representation of an actual ticket and that the token associated with the ticket has not been already sold.

To determine the above verification processes, a witness entity 30 may use verification tools that, for example, determine the person or entity listing the token for sale is the current owner of the token. This verification process may be accomplished by, for example, executing an Application Programming Interface (API) of a ticket ownership system or verifying against a list of prior sales. If the current owner of the token is not the person listing the ticket for sale, then a warning may be issued to the buying entity and the transaction may be aborted. In addition or alternatively, an indication or prompt may be generated to warn the buying entity that the transaction cannot be warrantied.

In certain embodiments, witness entity 30 may be able to verify the authenticity of a ticket offered for sale based on authenticity metadata associated with the token, if the authenticity metadata matches an expected value. This authenticity verification may be accomplished by, for example, verifying a bar code or other identifier against a database of digital tickets, or calling the API of a ticket ownership system. If the authenticity metadata does not match the expected value, then a warning may be issued to the buying entity or an indication or prompt may be generated to warn the buying entity prior to the sale transaction being finalized suggesting that the ticket token is likely unauthentic.

If one or more conditions associated with the authenticity or transferability of a ticket token are successfully verified by witness entity 30, then witness entity 30 may issue an authenticity and transferability certificate or, where desirable, a warranty certificate that the subject ticket offered for sale is authentic and transferable. These certificates may be digitally transferred to the purchasing entity at the time or after the transaction is completed. In certain embodiments, there may be an additional cost to the selling or the purchasing entity, depending on implementation, for providing the authentication and warranty services.

Additional costs for the authentication and warranty services, if any, may be either transparently disclosed, added to the sales prices, or be provided as an option. In the optional scenario, a purchasing entity may opt out or decline the authentication and warranty service and decide to purchase the ticket at its own risk. In a scenario in which witness entity 30 erroneously verifies the authenticity or transferability of a ticket, witness entity 30 may be held liable and required to compensate the purchasing entity for any loss incurred by the purchasing entity as a result of a warrantied transaction.

Monetary transaction system 15 may be configured to find one or more witness entities 30 that can be used to verify the authenticity and transferability of the ticket token. If a witness entity 30 is identifiable and can successfully perform the verification, then monetary transaction system 15 processes the ticket sale transaction. Otherwise, the transaction may be declined. In certain embodiments, the successful processing of a transaction is based on verification of the authenticity or transferability of the token by a minimum number of witness entities 30. If a predetermined threshold minimum is not met, then the transaction may be declined.

Witness entity 30 verification process noted above may be based on a series of electronic functions. As suggested earlier, before the payment transaction to the selling entity is completed, certain details (e.g., tokenized metadata) about the ticket and the ownership rights are sent to one or more witness entities. The selection of the witness entities, in one aspect, is either randomized or is based on predetermined factors (e.g., the amount charged by witness entity 30 for providing the verification service, the efficiency or the reputation of the witness entity, etc.). Witness entity 30 upon receiving the details, uses the related information (e.g., the metadata) to verify that the ticket token is authentic and transferable.

The details verified by witness entity 30 may include, by way of example, the owner of the token, the event time and location, the seat selection, the face value of the ticket, seat attributes such as aisle or handicapped-accessible, prior sales prices, or attributes of the buyer or seller such as past purchases, fan club status, or loyalty tier. Once witness entity 30 has verified the needed information or occurrence of certain events, then witness entity 30 may notify a smart contract (e.g., special purpose logic code executed on the monetary transaction system) to complete the financial transaction between the buying entity and the selling entity.

In certain aspects or implementations, witness entity 30 may approve an initial partial payment to the selling entity so that a transaction may be quickly processed. One or more secondary payments may be made later upon the confirmation of the transfer of rights on the content rights management ledger. Witness entity 30 may be implemented to notify the content rights management system 25 to take the needed steps to update the ownership records on the content rights management ledger to reflect the ticket sale or the transfer of ownership rights to the buying entity.

One or more smart contracts for managing the transfer of rights, or for monitoring the transaction between a buying entity and a selling entity, may be executed over monetary transaction system 15, content rights management system 25, or an independently operated computing system (e.g., a dedicated transaction or rights management server). The smart contract may use token metadata associated with a ticket to approve or prevent the transfer of a ticket if a selling entity is deemed unqualified or unidentifiable or if the authenticity or transferability of a token cannot be confirmed. As such, the transaction may not be approved or completed if witness entity 30 cannot confirm the requisite qualifications or identities, or if certain events that establish transferability, ownership or authenticity cannot be verified.

In one embodiment, when an electronic ticket sale is managed over an unintegrated monetary transaction system, secondary to the content rights management system, escrow requirements may be completed with a witness transaction process or approved by a witness entity 30, where the details of the sale are recorded on a distributed electronic ledger (e.g., blockchain) managed by the monetary transaction system. The following metadata may be recorded on the distributed ledger: offer to sell, asset to sell, selling entity identity, buying entity identity, verification of authenticity of the token, verification of transferability of the token, remuneration paid by the selling entity to the buying entity for the transaction.

After the transaction is recorded on the blockchain, the selling entity initiates transfer of the asset (e.g., an electronic ticket). An event that confirms the buying entity has received the asset may be also recorded on the blockchain. A witness entity 30 may be used to record an assertion to the blockchain and verify the completion of the transaction by, for example, confirming a delivery instrument or witnessing or identifying occurrence of certain events. Such events can include the initiation of a ticket transfer, an attempt to deliver the purchased ticket, or the delivery of the ticket.

In some aspects, the verification of the example events noted above may be done by way of witness entity 30 receiving one or more notifications from a delivery service, or witness entity 30 accessing records available on a distributed ledger associated with the content rights management system 25 through, for example, an API established between witness entity 30 and the monetary transaction system 15 or other intervening electronic platform used for detecting and processing certain expected events or instruments of delivery.

Witness entity 30 may be any of the parties involved in the transaction, the marketplace facilitating the transaction, the original content rights holder or primary issuer, or any third party. As part of the smart contract, the witness entity may receive remuneration as an award for providing the services for verifying, validating, or fulfilling the underlying transaction. Notably, one or more qualified witness entities may be specified by a smart contract managing the transaction. The smart contract may also allow that the sale agreement contain or record a list of acceptable or qualified witness entities as provided by either the buying entity or selling entity, or the amount of the transaction that is given to the witness entity for its services. The related information is recorded on a blockchain associated with the monetary transaction system as individual or separate records, depending on implementation.

Depending on implementation, witness entity 30 may be implemented as one or more of a processor or as software code executed in the cloud or one or more of computing system 10, computing system 20, or an independent computing system (not shown). The mentioned computing systems may act as servers that service verification requests. The verification process performed by witness entity 30 may be to confirm that the seller will or has transferred (or initiated the transfer of) the rights to the purchased ticket to the purchaser. Examples of events that may be verified include the act of initiation of the transfer (e.g., generation of a tracking number) or the completion of the delivery of the ticket (e.g., proof of delivery to the destination), whether physically or electronically.

It is noted that a primary ticketing agency or a licensed content agent may control the content rights management system 25 but may not control the monetary transaction system 15. Further, the primary ticketing agency may be chosen by an event producer or a content rights holder to manage ticket sales transactions and/or ownership rights, including the right of admission to a venue. In order to provide a better understanding of the electronic ledgers and platforms utilized and the information managed and recorded, details associated with controlling ownership rights, admissions, and sales transactions are disclosed with reference to figures noted below.

Figure 1B:
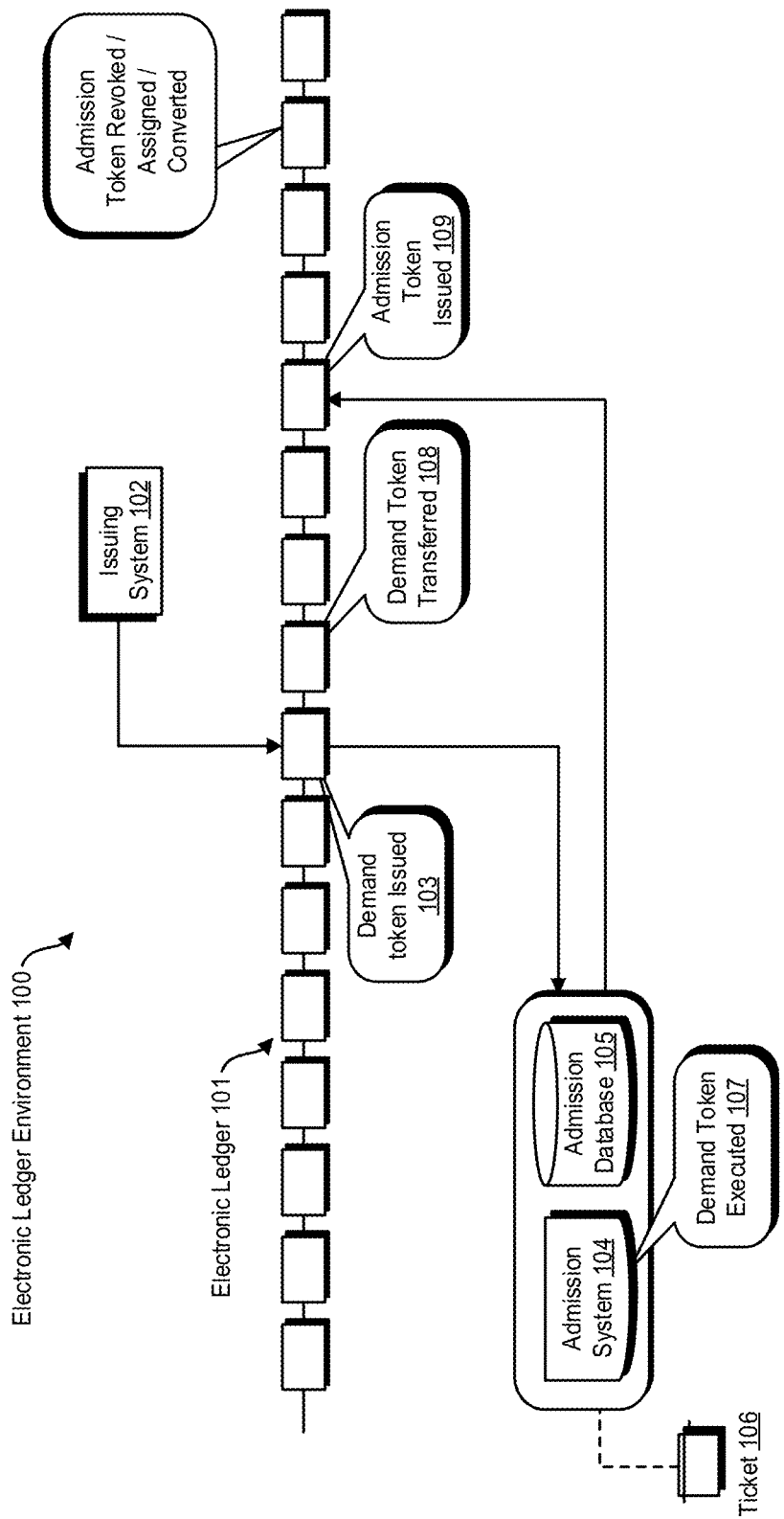
FIG. 1B illustrates an example electronic ledger environment, in accordance with one or more embodiments, wherein an electronic ledger in communication with an issuing system and an admission system may be utilized to manage electronic tokens.

Referring to FIG. 1B, an example implementation of an electronic ledger environment 100 is provided. At least one or both of electronic ledgers 40 and 50 illustrated in FIG. 1A may be implemented as shown in FIG. 1B to have several nodes in which operations associated with a monetary transaction or a rights transfer are recorded. The right of admission to an event may be represented by an electronic admission token recorded on electronic ledger 101. An electronic ledger environment 100 may be configured for ticketing, resale and admission rights management and to enable one or more entities (e.g., an originating entity or agency) to control and orchestrate functions and operations associated with the issuance, execution, pricing, commissions, transfer, assignment, or revocation of digital tokens.

Different types of digital tokens (e.g., a demand token and an admission token, described in further detail below) may be implemented or instantiated to represent certain rights to buy or sell event tickets or admission to an event or venue, and also to control or determine the number of outstanding tickets that are remaining in the hands of resellers. Using an electronic ledger platform, such as a blockchain-based transfer mechanism, can decentralize transactions, exchange sales data, and obligate multiple parties to payments, while preserving information secrecy for each party involved in the transaction chain.

In some embodiments, a blockchain may be used to record price and fee data in a decentralized and reliable manner, allowing sellers to transfer tickets freely, while simultaneously accounting for resale fees and commissions or other transaction data or metadata. The above operations advantageously may be performed without the direct integration of different systems and technologies used by the multiple parties involved in the transactions. This implementation results in a more robust and simple operation environment in which a mixing pool may be optionally added to obfuscate transacted business information and prevent the information from being disclosed to unauthorized parties but ensuring that all parties ultimately trust the transactions' outcome and efficacy.

According to certain implementations, one or more smart contracts are used to allow a primary issuer to monitor the resale price of tickets as they are sold in downstream transaction. When a transfer of a ticket token discloses a transfer price (either explicitly or conjointly with a payment ledger entry), a commission is required to be paid to a party other than the seller (e.g., to the originator, or originators agent, or some other upstream seller) based upon the transfer price and a previous transfer price (e.g., any prior transfer price or the purchase price paid by the reseller) recorded in the blockchain. Additional commissions may be paid on downstream transactions to upstream sellers, until it is finally sold to a consumer.

Based on the above implementation, additional commissions (beyond any earlier or initial commissions) are paid on downstream transactions, in view of additional prices paid above the ticket's face value or based on the incremental increase in the sales price of the ticket as the ticket is being sold to downstream resellers until it is finally sold to a consumer. This additional commission can help align the interests of the content rights holders and primary issuers with the resale parties.

As shown in FIG. 1B, one or more blockchain-based systems may be utilized to maintain a record of issuance and exchange of an electronic token associated with an asset (e.g., an event ticket) and automatically execute a transfer of an amount of cryptocurrency to an originating entity when the token is transferred between entities in downstream exchanges occurring on an electronic ledger platform. As the token is transferred between entities, the token may be exchanged for an increasingly value (e.g., a larger quantity of cryptocurrency). A subsequent transfer of the token, in certain aspects, triggers an executable program (e.g., a smart contract) stored on the electronic ledger which causes a portion of the cryptocurrency paid in the transfer to be provided to an upstream seller, such as the originator or the originator's agent. A blockchain-based system also maintains a record of what is provided to the originator across transactions of the same token. As such, the amount of cryptocurrency provided to the originator in subsequent transfers of the token depends on the previous transfers. In this way, the system maintains the state and information about multiple transfers of the same token.

In accordance with one or more aspects, content rights management system 25 utilizes an electronic ledger system (e.g., a blockchain platform) configured to control and verify ownership rights and restrictions on transfer of electronic tickets to qualified purchasers. The restrictions can include limitations on ownership, privileges, or the transfer price for an electronic token offered for sale. An electronic token may be initially issued for sale with metadata embedded in or otherwise associated with the token. The metadata can be evaluated by a smart contract, for example, to determine whether certain restrictions are associated with the token. The restrictions can indicate, for example, that the issued token is non-transferable, or that it is transferable only to a certain group or class of purchasers (e.g., qualified purchasers such as members of a fan club). The restrictions can also be used to set the sales price for a ticket based on the identity of the purchaser.

In one implementation, a restriction attached to a token may indicate that, if the token is transferred to an unqualified purchaser, the sales price for the ticket will be at a certain sales price (e.g., a price higher than the face value or a previous sales price). Accordingly, if the token is transferred to an unqualified purchaser (or in a manner that one or more rules, conditions, or restrictions attached to the token are violated), then a smart contract executing the transfer either (1) blocks the transfer, (2) restricts the transfer or privileges associated with the token, or (3) causes the transfer at a sales price (e.g., a premium price) that would result in a portion of the sales price paid by the unqualified purchaser to be paid to an original issuer of the token or other seller in the upstream chain of commerce.

Effectively, a smart contract assigned to monitor a token transfer, in certain embodiments, prevents the transfer of a restricted token to an unqualified purchaser, unless the restriction can be lifted by satisfying certain defined conditions or rules. For example, an unqualified purchaser may be given the option to obtain a qualified status (e.g., by subscribing to a fan club membership, or use a certain source of funds like a special credit card, etc.). Thus, advantageously, a content rights holder or original seller (or primary ticketing agency) can provide perks and privileges to identifiable groups of qualified purchasers or incentivize purchasers to become members of those groups. These privileges may include a discount on the ticket price, VIP privileges, and other accommodations which cannot be passed on to an unqualified purchaser.

To determine whether a purchaser is qualified for privileges attached to a token being transacted, a verification module or logic code (e.g., a witness entity 30) may be implemented to facilitate token exchanges and transactions being performed over the electronic ledger. The verification module may act in concert with a smart contract implemented as a part of the monetary transaction system 15 that is configured for verifying a transaction, in view of identifying information available on one or more databases or data sources. This identifying information is used by the verification module to authenticate a purchaser so that the smart contract can validate whether privileges associated with a token can pass on to the purchaser, as provided in further detail herein.

The verification module, in one embodiment, is deployed to write assertions to one or more records or blocks on the electronic ledger. The assertion written to the blocks include at least one or more of a customer identity (e.g., wallet ID, email address), customer status (e.g., loyal fan, longtime customer, VIP, etc.), verification time for the transaction, and expiration time for completing the transaction. When processing a transaction, the smart contract uses the data in the assertions recorded on the blocks of the electronic ledger and determines whether the transaction can be authorized. If the assertions recorded on the electronic ledger fail to identify the purchasing entity as matching one or more of the above verification factors (e.g., if the identity or customer status is not a match with a parameter expected by the smart contract), then the transaction is not validated by the smart contract.

In some embodiments, the verification module communicates with the smart contract about the identity of a purchaser. After searching through one or more data sources the verification module writes assertions to one or more blocks on the electronic ledger, for example, if the verification module can authenticate the identity of the purchasing entity. Based on these assertions, the smart contract invoked to validate the transfer approves or denies the transaction using the data in the assertion written by the verification module. In alternative embodiments, an independent system (other than the smart contract or the verification module) may be used to determine the qualifications of the purchasing entity and notify the verification module to write the proper assertion to the electronic ledger.

In one or more aspects, the smart contract is implemented to invalidate a transaction, if the data in the assertion does not match the identity or classification expected for a purchaser, or if an assertion matching the purchaser is not written to the electronic ledger. For example, the token originator can be authorized to write loyalty status assertions for one or more entities to the electronic ledger. The originator may write an assertion that Customer A is enrolled in a certain loyalty program for a certain time period (e.g., Customer A has VIP status, the VIP Status is valid from Jan. 1, 2022 to Dec. 31, 2022, at a 20% discount). If a transaction is written to the electronic ledger that satisfies the asserted loyalty program status and time period for Customer A, then the transaction is approved by the smart contract and the token is transferred to Customer A at the discounted rate. Conversely, another transaction for Customer B may be rejected for the discounted rate, if no assertion records are found on the electronic ledger that would identify Customer B as enrolled in the loyalty program for an indicated dates.

Referring back to FIG. 1B, an electronic ledger environment 100 may be implemented as an immutable mechanism for ticket issuance and transaction flow management in which parties involved in issuing and executing electronic tickets may write and read data and instructions associated with one or more processes using an electronic ledger 101. The electronic ledger 101 may provide the infrastructure in which the parties that manage the ticketing process may communicate by writing to block addresses designated to the parties engaged in the process.

As shown, the example electronic ledger 101 includes a plurality of linked data blocks. The electronic ledger 101 may be communicatively connected or coupled to issuing system 102 and admission system 104 configured to respectively issue and execute one or more digital tokens, such as a demand token. A user may interact with the issuing system 102, by way of a user interface mechanism for example, to request a demand token to be issued.

The process model for the electronic ledger 101 may define parameters and constraints associated with the manner in which token data is to be utilized or manipulated. For example, in certain embodiments, the rules for managing the demand and admission tokens may provide for the following:

A demand token to be recorded on the electronic ledger 101.

The demand token to be freely transferred on the electronic ledger 101 subject to any smart contracts.

The demand token to be executed to request an admission token.

An admission token to not be transferable on the electronic ledger 101.

An admission token to be exchangeable for a demand token.

Admission tokens to be stored or redeemed either on the electronic ledger 101 or in another system (e.g., an event provider's point of sale system).

Figure 1C:
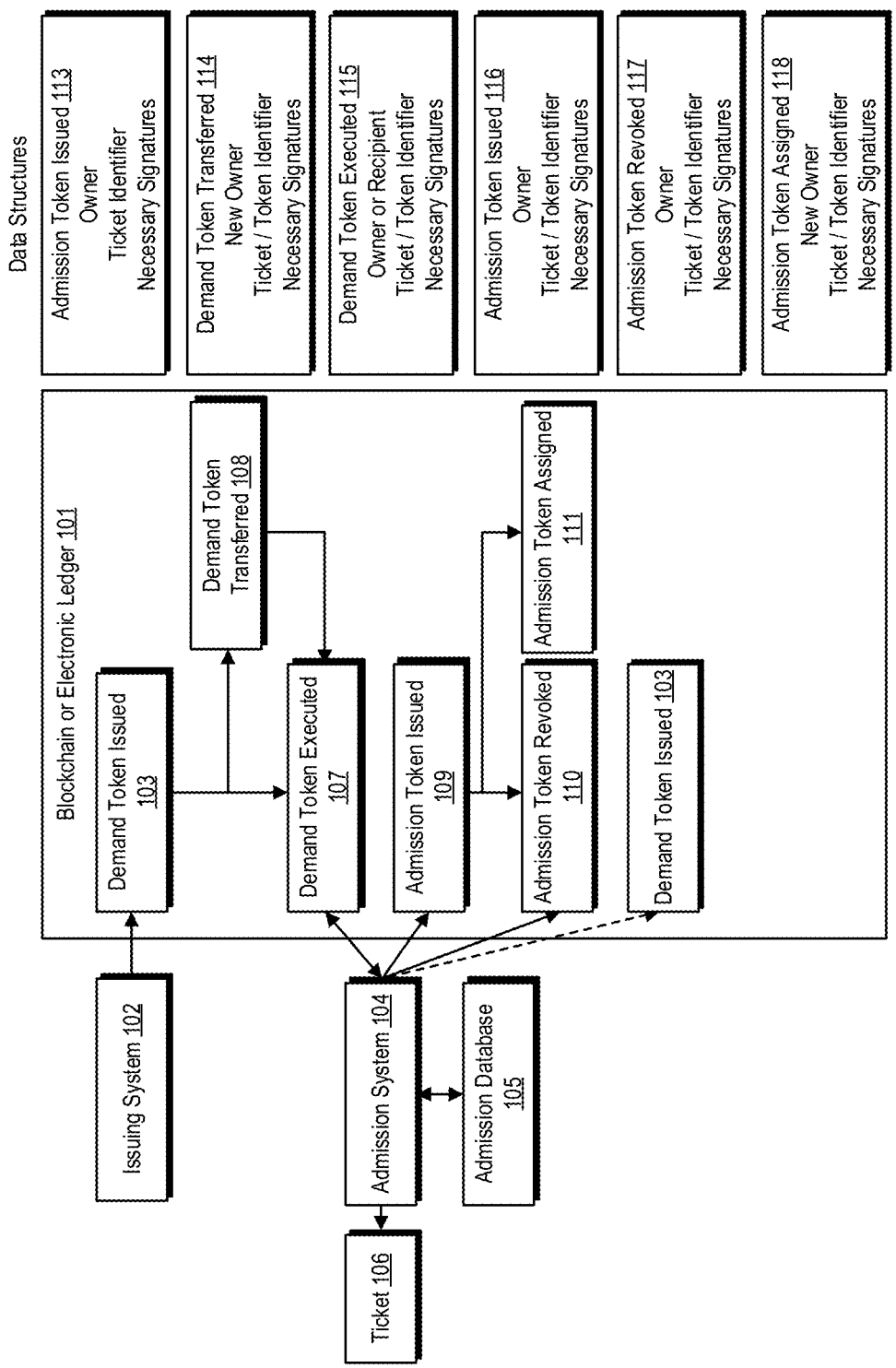
FIG. 1C illustrates an example blockchain or electronic ledger, in accordance with one or more embodiments, where one or more types of the electronic tokens may be issued, executed, assigned, or revoked.
Figure 1D:
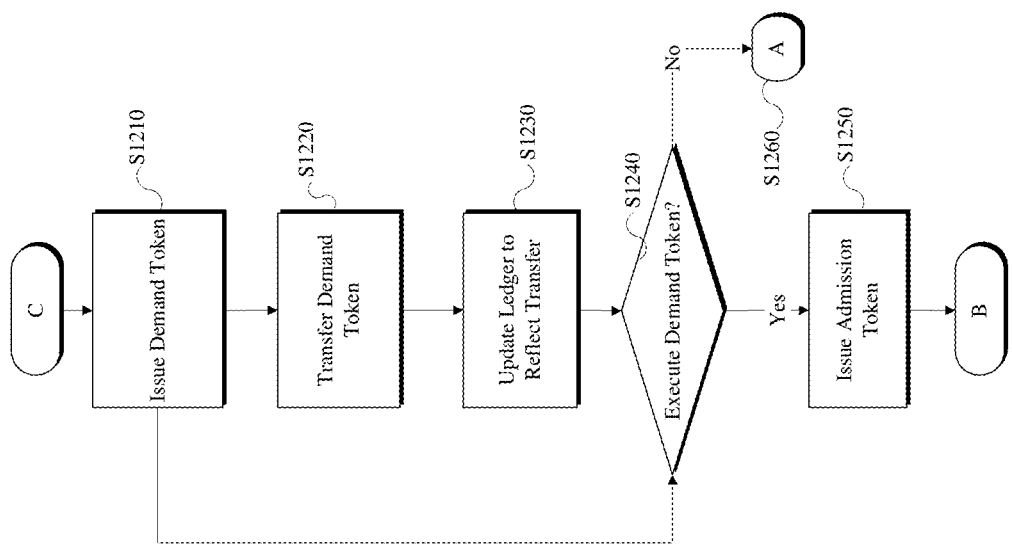
FIGS. 1D and 1E are example flow diagrams for managing different types of electronic tokens using an electronic ledger environment or platform, in accordance with one or more embodiments.

Referring to FIGS. 1B, 1C, and 1D, the process for managing demand tokens and admission tokens may be implemented by enabling one or more nodes of an electronic ledger platform to carry out operations with respect to one or more records in the electronic ledger platform. These operations, in one example, include the electronic ledger platform receiving an indication to exchange a first token of a first type (e.g., a demand token) with a second token of a second type (e.g., an admission token). The indication received as authorized by a first entity (e.g., a seller or owner of an event ticket) allows for the exchange of the first token with the second token.

The first token, in some aspects, is associated with ownership information that indicates the first token is owned by the first entity. The first token may also include activity information (e.g., data or metadata) about a first activity, such as a concert to be held at a certain date and time and commission and pricing details. The ownership of the first token is transferable to other entities (e.g., purchasers, resellers, or the general consumer public) over the electronic ledger environment 100 according to the ownership information associated with the first token as provided in further detail below.

In accordance with one or more embodiments, the electronic ledger 101, in response to receiving an indication to exchange the tokens, generates the second token, which is associated with the ownership information and may also include admission information. The ownership information may indicate that the second token is owned by the first entity. The admission information indicates that the second entity is to be admitted to or allowed to participate in the first activity. The generation of the admission token may be committed to one or more database records of a legacy system, or records in an electronic ledger platform, in accordance with a first protocol.

Referring back to FIG. 1D, in one example embodiment, an issuing system 102 issues a demand token (S1210). The issuing of the demand token may be accomplished by writing the demand token on a block of electronic ledger 101. The issuing system 102 may be, without limitation, a sales system or an admission system 104 depending on implementation. The block on the electronic ledger that stores a record to reflect the issuance of the demand token may include data identifying a first-in-time or earlier-in-time owner, a ticket identifier, and/or the electronic signatures used for verifying the authenticity of the record.

The ownership of the demand token may be transferred from a first party to a second party by committing a transaction associated with the transfer of the ownership to one or more records on the electronic ledger. Parties may (but need not) transfer the ownership of the demand token by writing a demand token transfer record to a block on the electronic ledger. The record reflecting the transfer may include one or more of data identifying a second-in-time or later-in-time owner, a reference to the ticket or token identifier, and the respective signatures for authentication of the record. At this state of the transaction, the ownership of the demand token is deemed to have been transferred from a first owner to a second owner (S1220). Subsequent demand token transfers may be performed to transfer ownership to subsequent owners and the electronic ledger blocks may be updated to reflect the transfer (S1230).

In some embodiments, the ownership of the demand token becomes non-transferable, in response to generating the admission token. While the ownership of the admission token may be assignable, the admission token may be non-transferable over the electronic ledger or not recorded on the electronic ledger at all. The demand token is generated by the issuing system 102, where the admission token is generated by executing the demand token by the admission system 104. The admission system 104 is notified of a request for execution of the demand token based on reading an execution request written to a record of the electronic ledger. Advantageously, the ownership information associated with the demand token is traceable based on the ownership information written to a record of the electronic ledger (e.g., when ownership of the demand token is transferred from a seller to a buyer).

Referring again to FIG. 1D, in certain embodiments, the owner of a demand token may have the option to execute the demand token (S1240) in order to receive an indicia for submission to an admission system 104 and seeking admission to an event. Once the admission system 104 is notified of a request for execution of the demand token, an admission token is issued (S1250) and the demand token is transitioned to a non-transferable state. Depending on implementation, the demand token becomes non-transferrable just prior to, immediately after, or simultaneously as when the admission token is issued. Otherwise, the demand token will remain in a transferable state, as provided in further detail below (S1260). Accordingly, in response to the execution of the demand token, the admission token is associated with a right to attend the first activity such that a first entity is admissible to the first activity upon redemption of the admission token.

For example, the request for execution of the demand token may be implemented in form of a redeem request (e.g., a "redeem me" message) written to a record of the electronic ledger 101. The admission system 104 may be a legacy admission system that issues the admission token, in response to determining that the redeem request is written to a record of the electronic ledger 101. A legacy admission system as used herein refers to a system that is in use for the purpose of validating admission to an event and operates based on conventional ticket processing and validation technology (e.g., not using functionality related to blockchain transactions or other transactions on an electronic ledger platform).

Depending on implementation, a legacy admission system may be configured to communicate with a blockchain or any electronic ledger platform to issue the admission token in form of a quick response (QR) code that is transmittable to a communication device (e.g., a smartphone) utilized by an individual who desires admission to an event. In response to scanning the QR code, a record in an admission database 105 of the legacy admission system may be updated to indicate the second token is redeemed.

Accordingly, depending on implementation, the execution of the demand token may be accomplished in different manners. In one example, the admission system 104 may be notified, either directly or indirectly, by way of writing a demand token execution record to a block of the electronic ledger 101. As a result of the execution of the demand token, the owner of the demand token receives an admission token, which would be an asset of some form (e.g., a QR code, a URL, an e-ticket, a paper ticket, etc.) that allows admission to the event. A suggested earlier, in embodiments in which redeeming the admission ticket does not require a proof of transaction on the blockchain, the admission process can be streamlined efficiently and quickly obviating the need for a relatively lengthy wait time associated with blockchain transactions.

The admission system 104, in one or more embodiments, may create or modify data records in an admission database 105 to facilitate admitting attendees. An admission token record, if stored on the electronic ledger 101 may contain one or more of data identifying the owner of the admission token, a ticket or admission token identifier, and the corresponding signatures for authenticating the data. In certain implementations, a demand token execution record may be written to the electronic ledger 101 to indicate that no further transfer requests may be executed for the demand token or admission token that has been issued, unless the admission token is revoked or assigned.

Figure 1E:
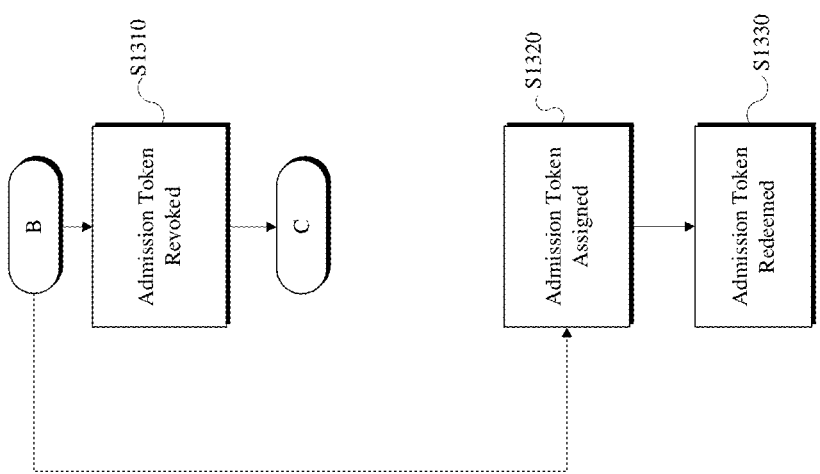

Referring to FIGS. 1B and 1E, the admission system 104 provides for an admission token to be transferred by revoking the admission token (S1310). An admission token once revoked may be converted back to a demand token. This may be accomplished by writing an admission token revocation record to the electronic ledger 101 and causing a demand token issued 103 record to be added the electronic ledger (see FIG. 1D, S1210). The revocation of the admission token may be performed in a single step or multiple steps and may involve multiple other systems, including a separate issuing system 102, for example.

The admission system 104, in one embodiment, signals a change in ownership of an admission token by assigning an admission token (S1320). The assigning of an admission token is accomplished using different methods or schemes. For example, an admission token may be assigned by writing an admission token assigned record to the electronic ledger 101. The owner of an admission token may transfer or transact an admission token and give to another owner. One or more smart contracts may be utilized, where the original issuer or administrator (e.g. a primary ticketing agency) could force an admission token assignment either by revoking or reissuing the token or by issuing an assignment record, for example. As noted earlier, once an admission token is assigned to an owner, the owner may redeem the admission token at the time of attending an event (S1330).

It is noteworthy that the electronic tokens and the corresponding systems disclosed herein may be utilized for the purpose of providing an owner of the admission token with access to any venue including, without limitation and by way of example, movie theatres, performance theatres, museums, exhibitions, concerts, seminars and any other type of event that may utilize or require admission by way of redemption of a ticket or other indicia of ownership. In certain implementations, the same or similarly implemented electronic tokens, platforms, and infrastructures may be utilized for providing an owner of an admission token with access to any type of content including, without limitation and by way of example, on-demand movies, and webpage or social media content, whether in form of text, audio or video, electronic books, etc.

Figure 1F:
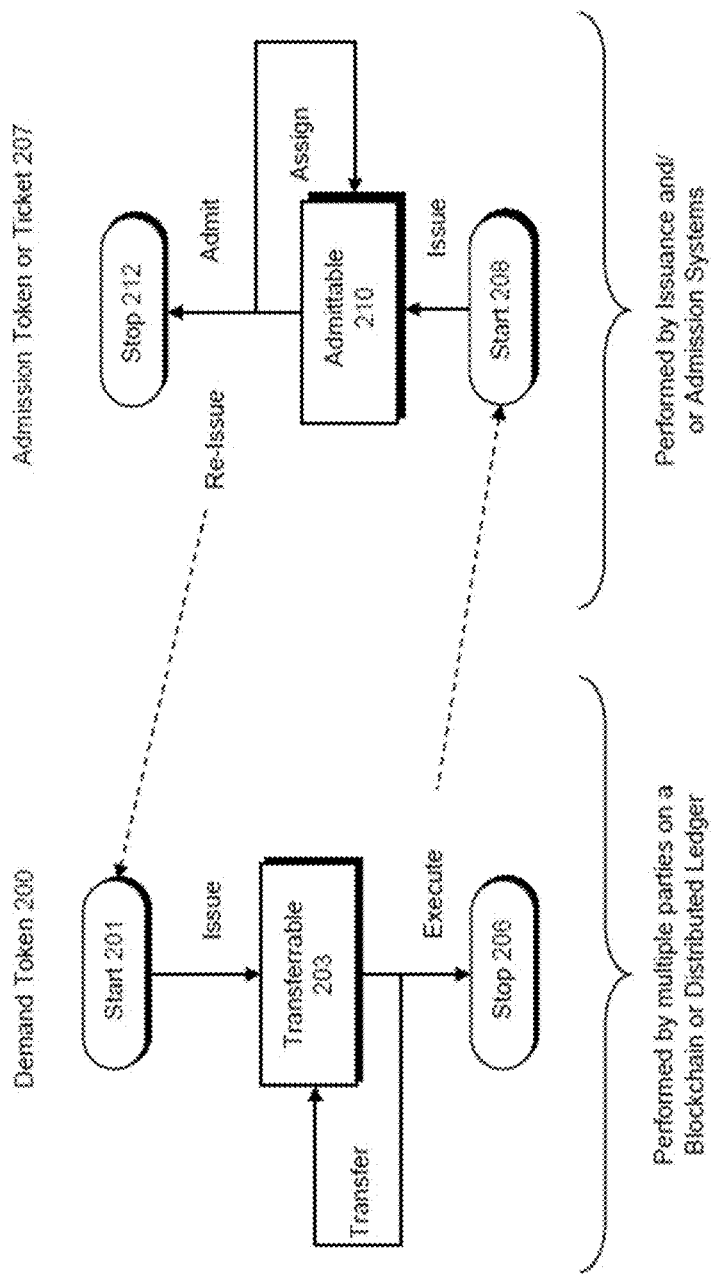
FIG. 1F is an example flow diagram illustrating possible state transitions for different token types, in accordance with one or more implementations.

Referring to FIG. 1F, demand tokens and admission tokens may be distinct in accordance with one or more embodiments. As shown, the admission system 104 may be configured to convert tokens from demand tokens to admission tokens and vice versa. The state transition diagram of FIG. 1F illustrates the respective relationships. In one implementation, at a start state 201, the demand token is issued by an issuing system 102. The issued demand token may be held in a transferable state 203 and a current owner may transfer the demand token to a new owner, where the demand token remains transferable.

The current owner or the admission system 104 may execute the demand token, resulting in the demand token transitioning to a stop state 206. The admission system 104 may issue an admission token (i.e., a ticket) as the result of a demand token execution record or for other reasons such as a direct purchase of an asset. The current owner or bearer may then be admitted to the corresponding event using the admission token by way of an admission system 104. Upon admission, the admission token is depleted and the system transitions to a stop state 212.

In certain embodiments or configurations, the admission system 104 may reissue a demand token or a non-depleted admission token for the purposes of further transfer. A demand token is started at start state 208 in such a scenario and the admission token is transferred to a stop state 212. In some implementations, the admission system 104 may assign an admission token from a first owner to a second owner. Notably, in certain implementations, a demand token may be retired or stopped and then restarted or reissued as another demand token representing the same ticket.

In accordance with one or more aspects, the demand token may be configured to be transferable over a blockchain and the admission token may be configured to be non-transferable over the blockchain. In certain embodiments, the non-transferability of the admission token may be due to the admission token being assigned to a non-transferable state. In certain other embodiments, the non-transferability of the admission token may be due to the admission token not being transferable on the same blockchain, where the demand token is transferred.

As such, in one or more implementations, an issuing system 102 in an electronic ledger platform issues a demand token associated with ownership rights to an admission token. The demand token is written to a block on an electronic ledger such that transfer of ownership rights to the issued demand token is subject to validation rules associated with the electronic ledger. In response to a request for execution of the demand token, an admission token is issued. The admission token is associated with a right to attend an event such that an owner of the admission token is admissible to the event upon redemption of the admission token.

The validation of transfer of ownership on the electronic ledger may be subject to validations rules (e.g., a first protocol or a validation protocol) that is different than the redemption rules (e.g., a second protocol or a redemption protocol) associated with the redemption of an admission token. In some aspects, processing the redemption of the admission token is subject to a redemption protocol that is less time consuming than processing the transfer of the ownership rights to the issued demand token subject to the validation protocol associated with committing transactions on the electronic ledger.

Without limitation and by way of example, in some embodiments, the generation of the admission token may be committed to one or more database records of a legacy system, or records in an electronic ledger environment 100 (e.g., an electronic ledger platform), in accordance with a one or more protocols. The protocols control and memorialize the downstream exchange of the tokens and the related transactions among multiple parties and are configured to commit the tokenized transactions to at least a blockchain or an electronic ledger 101, as provided in further detail below.

Figure 2A:
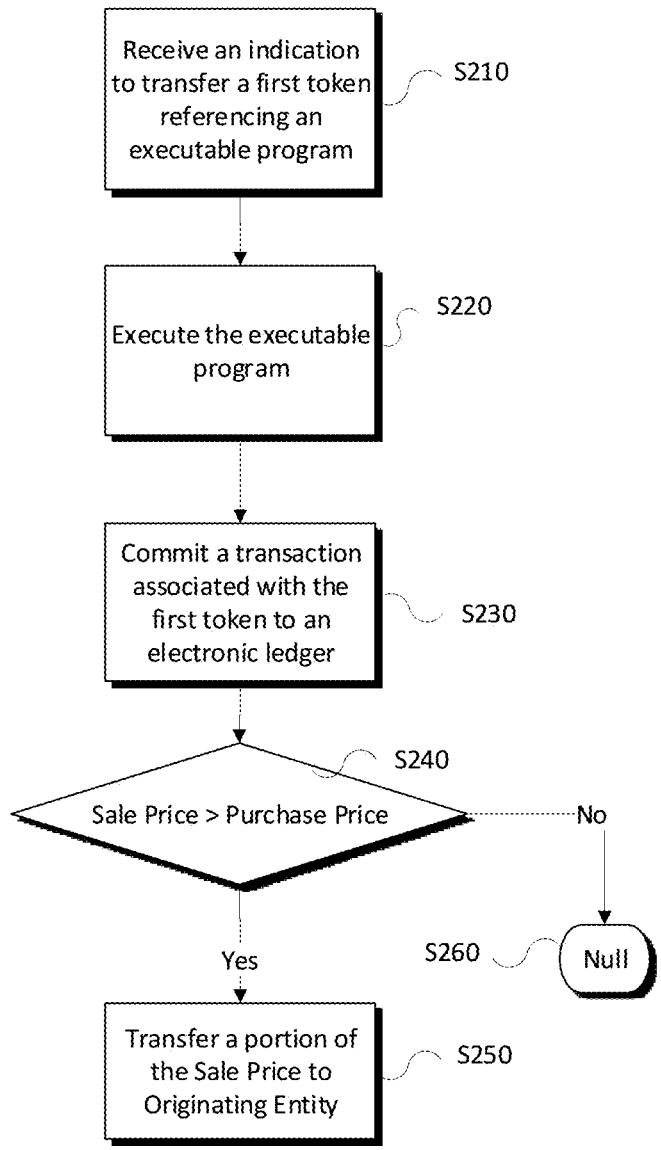
FIGS. 2A and 2B are flow diagrams illustrating example processes for controlling downstream token transactions in an electronic ledger, in accordance with one or more embodiments.

Referring to FIG. 2A, in one example embodiment, one or more nodes of an electronic ledger 101 carry out operations with respect to one or more records of the electronic ledger 101 in order to enable tokenized transactions involving the purchase and sale of intangible or tangible items (e.g., event tickets). The transactions may involve multiple parties. By way of a non-limiting example, when an originating entity, such as an event or media producer (or an agency associated with the event or media producer), desires to sell tickets for an event, the electronic ledger environment 100 may be used to track the sales of tickets from the originating entity to the downstream resellers and ultimately the consumers.

The tracking may be performed by way of recording in the electronic ledger 101 records unique identification information and metadata associated with a cryptographic token (e.g., an admission token, or a demand token) that provides the right of admission to the event. In certain embodiments, the downstream resellers automatically pay a commission on a downstream sale due to the transacted cryptographic token being associated with an executable program (e.g., a smart contract stored on the electronic ledger 101) configured to calculate a commission value to be paid to an identified upstream seller (e.g., the originating entity or an agent of the originating entity).

In one example scenario, when a transaction is initiated between a seller and a purchaser, the electronic ledger 101 receives an indication authorized by the selling entity to transfer a cryptographic event token (e.g., an electronic ticket) to a purchasing entity. When the transaction is approved, the transaction details (e.g., ticket price, identity of the seller, identity of the purchaser, unique ticket ID, etc.) may be recorded in the electronic ledger 101.

As noted herein and above, in addition to the transaction details, a reference to an executable program may also be registered with the admission or demand token to calculate a commission to be paid to an upstream seller by a downstream reseller, as provided in further detail below. Notably, when a transaction is the first transaction in the chain of transactions associated with a particular token, the selling entity is typically the originating entity. In such a transaction, the purchasing entity may be either a downstream reseller (e.g., an entity who intends to resell the token) or a consumer (e.g., an individual who intends to attend the event). In one example implementation, in an initial sale transaction involving the sale of a tokenized ticket over the electronic ledger 101, no commission is paid to any of the entities involved in the transaction. Therefore, an executable program associated with the token being exchanged is either not executed or, if executed, returns a null or zero value indicating no commission is to be paid.

Referring back to FIG. 2A, consider another example scenario in which the selling entity is a reseller and the purchasing entity is either another downstream reseller or a consumer. For the token to be transferred to the purchasing entity, the electronic ledger 101 receives an indication from the selling entity to transfer a token to the purchasing entity, where the token references an executable program (S210).

In one example embodiment, the indication references a first quantity of cryptocurrency associated with a purchase price (e.g., 0.005 BTC) paid to the selling entity by the purchasing entity in exchange for the token. In some examples, the token being transacted is associated with a record of a second quantity of cryptocurrency (e.g., 0.004 BTC) reflecting consideration paid to one or more other entities (e.g., upstream resellers) by the selling entity at an earlier time in exchange for the transfer of the token to the selling entity.

As a part of the processing of the token exchange between the selling entity and the purchasing entity, one or more nodes in the electronic ledger 101 execute an executable program (e.g., a smart contract) referenced by the token (S220). In response to the execution of the executable program, information about the transaction associated with the sold token is committed to at least one record of the electronic ledger 101 in accordance with a token transfer protocol (S230). The transaction information may include data or metadata about one or more of the following:

the transfer of the token to the purchasing entity,
the transfer of a first portion (e.g., a commission) of the first quantity of the cryptocurrency to a third entity (e.g., the originating entity or any upstream entity involved in a prior sale of the same token), and
the transfer of a second portion (e.g., net sale proceeds after commission) of the first quantity of the cryptocurrency to the selling entity.

The commission amount, depending on implementation, may be determined based on the first quantity and the second quantity of the cryptocurrency. By way of example, if the reseller sells a demand token or an admission token to a downstream purchaser for 0.005 BTC (e.g., sales price or the first quantity of cryptocurrency) but had purchased the demand token or the admission token from the originating entity or an upstream seller for 0.004 BTC (e.g., purchase price or the second quantity of cryptocurrency), then a calculated commission paid to the upstream purchaser may be based on a percentage of the difference between the 0.005 BTC and 0.004 BTC (e.g., x % of 0.001 BTC).

It may first be determined whether the sales price is greater than the purchase price (S240) because a reseller, at least in one example embodiment, should not have to pay a commission if the reseller broke even or incurred a loss when selling the token. If the reseller generated a profit, however, then a portion of the sales price (e.g., a commission) is paid to the originating entity or other upstream seller (S250) due to the automatic execution of the executable program or smart contract stored on the electronic ledger 101. The records of the electronic ledger 101 may be updated to indicate that a transaction did not result in a profit and, depending on implementation, the executable program may either not be executed or may return a zero or null value to indicate no commission is due (S260).

In addition to the above noted data and metadata stored and processed in the electronic ledger environment 100, in certain embodiments, a token involved in the electronic ledger transaction may further include a reference or information about a third quantity of cryptocurrency (e.g., 0.002 BTC) representing the face value of an event ticket as issued by an originating entity. In this context, the face value would be the amount of cryptocurrency paid by an upstream reseller to, for example, an originating ticket sales agency upon an initial transfer of the token from the originating entity to an upstream reseller. Depending on implementation, the face value of the ticket may be also taken into consideration as a factor in calculation of commissions by the executable program in downstream transactions.

Figure 2B:
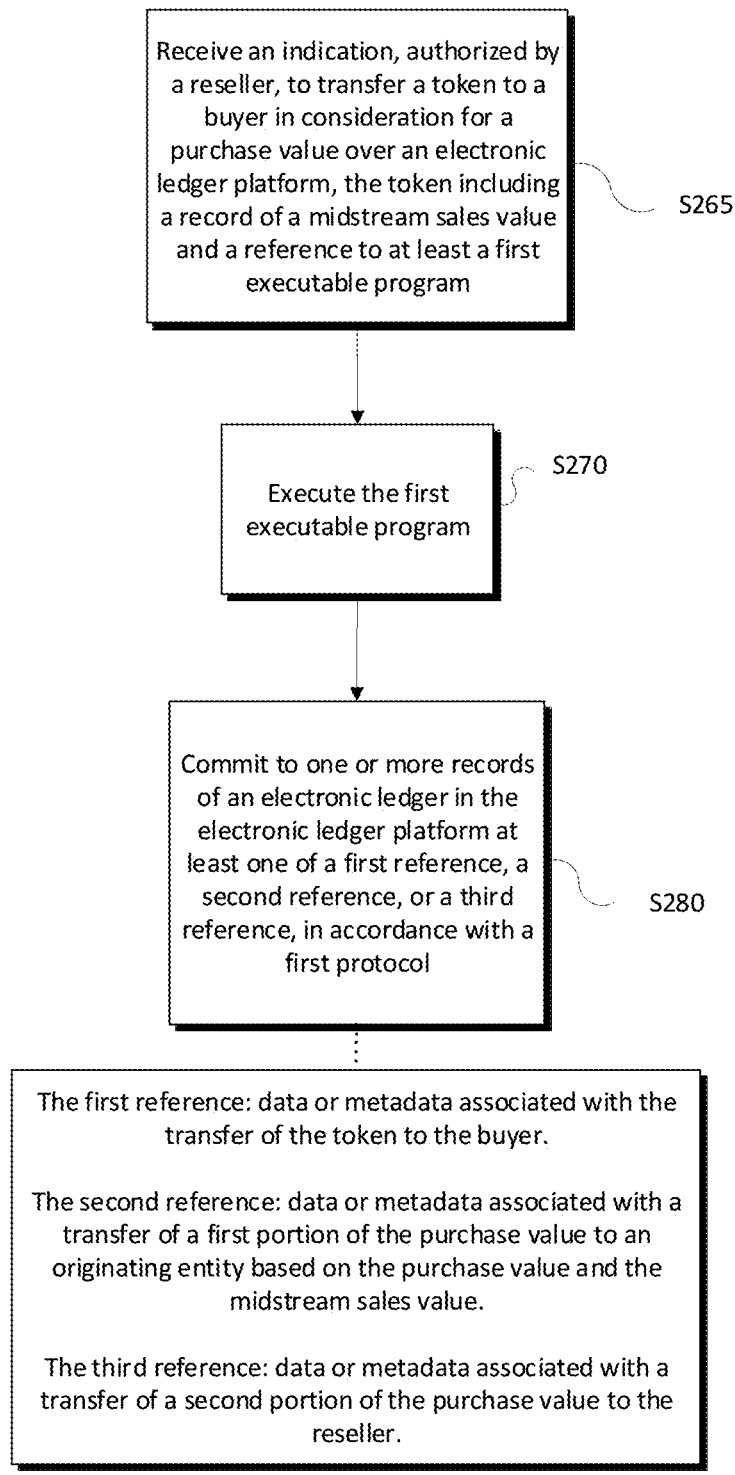

Referring to FIG. 2B, in another example embodiment, one or more nodes of an electronic ledger 101 may be configured to carry out operations to transfer a cryptographic token between multiple entities, such as an originating entity, a reselling entity (reseller), and a purchasing entity (purchaser), for example. An indication authorized by the reseller is received by a node in the electronic ledger 101 to transfer the token to the purchaser in consideration for a purchase value (e.g., 0.005 BTC) over the electronic ledger platform (S265). The purchase value may be in any denomination of currency, including cryptocurrency, such as Bitcoin (BTC), Ethereum (ETH) or other tradable currency that can be exchanged over the electronic ledger 101.

In some aspects, the first cryptographic token includes a record of a midstream sales value (e.g., 0.004 BTC) provided by the reseller to the originating entity in consideration for transfer of the first cryptographic token to the reseller (not shown in FIG. 2B). The first cryptographic token may also include a reference to at least a first executable program. In response to the execution of the first executable program (S270), at least one of a first reference, a second reference, or a third reference are committed to one or more records of the electronic ledger 101 in accordance with a first protocol configured to verify and settle cryptocurrency transactions on the electronic ledger platform (S280, S290).

Depending on implementation, by way of example and without limitation, the first reference includes data or metadata associated with the transfer of the first cryptographic token to the purchaser in exchange for the purchase value (e.g., 0.005 BTC) paid by the purchaser to the reseller. The second reference includes data or metadata associated with the transfer of a first portion of the purchase value (e.g., a commission) to the originating entity, where the commission is determined based on the purchase value and the midstream sales value (e.g., a percentage of the difference between 0.005 BTC and 0.004 BTC). The third reference may include data or metadata associated with the transfer of a second portion of the purchase value (e.g., net profits) to the reseller.

In the above example, if the reseller purchased the token for 0.004 BTC from the originating entity and sold it to the purchaser for a midstream sales value of 0.005 BTC, then the gross proceeds to the reseller would be the midstream sales value minus purchase value (0.005 BTC-0.004 BTC), which is 0.001 BTC. Assuming an example 10% commission rate, the commission value payable to the originating party is calculated as 0.0001 BTC with a net payment of (0.005 BTC-0.0001 BTC) 0.0049 BTC payable to the reseller.

In another example, instead of cryptocurrency other denominations of currency, such as the United States Dollar, can be used to make the transaction on the electronic ledger. For example, if the reseller purchased the token for $150 from an upstream seller and sold the token to a downstream purchaser for a sales value of $200, then the profit to the reseller is the sales value minus purchase value ($200-$150), which is $50 in this example. Assuming a 10% commission rate on the profit of $50, for example, the commission value payable to an upstream seller is calculated as $5 with a final amount of ($50-$5) $45 payable to the reseller.

Referring back to FIGS. 1A and 1B, for a token transaction to be successful, the transaction or an indication received by the electronic ledger 101 for making a payment may need to be authorized by both the selling entity and the purchasing entity. As shown in FIG. 1A, for example, a transaction associated with the transfer of ownership rights in the token may be committed in a first electronic ledger (e.g., electronic ledger 50) and the transfer of the commission amount to a designated entity may be committed in a second electronic ledger (e.g., electronic ledger 40). As shown in FIG. 1B, in some implementations, a transaction associated with the transfer of the token to the purchasing entity is committed to a first record of the electronic ledger 101 and the transfer of the commission amount to a designated entity is committed to a second record of the electronic ledger 101. In alternative embodiments, the transaction data may be recorded in a single record of the electronic ledger 101 for a single transaction. Electronic ledger 101 may be implemented as, or included in, electronic ledger 40 or electronic ledger 50 (or both) or in as a part of a data structure independent of either electronic ledger 40 or electronic ledger 50, depending on implementation.

The calculation of the commission, in certain implementations, is such that the originating entity (or an upstream seller) determines the amount of commission to be collected by the executable program for each incremental downstream transaction. For example, the commission paid may be a fixed value (e.g., $10 per transaction) regardless of the value of the token transactions, or gross profits or net profits of the reseller. Alternatively, the commission paid may be a percentage of the difference between the amount paid by a reseller in purchasing the token and the amount received by the reseller when selling the token and optionally taking into account certain other factors, such as the face value of the ticket or the general state of ticket sales.

In one or more implementations, multiple executable programs (e.g., multiple smart contracts) are associated with the same token, such that a first upstream seller receives a first commission for a downstream sale, and a second upstream seller receives a second commission from the same downstream sale. In such a scenario, a downstream seller would automatically pay from the amount collected, in exchange for the sale of a token, a first commission to the first upstream seller upon execution of the first executable program, and also pay a second commission to the second upstream seller upon the execution of the second executable program.

It is noteworthy that, in certain embodiments, one or more executable programs associated with the token being transacted are executed for every downstream transaction involving the token. In other words, an upstream seller to which a commission is due (e.g., as a result of the execution of a smart contract) will receive a commission on the incremental increase in the sales price of a ticket being sold in the downstream commerce until the final sale. Certain rules, conditions, and factors may be interjected into one or more executable programs to adjust or manipulate the amount of commission due on one or more downstream transactions.

In one example scenario, a first smart contract may be executed to govern a ticket transaction between a reseller and a consumer as well as to govern a commission transaction between the reseller and an upstream seller. In another example scenario, a second smart contract may be executed to govern the commission transaction between the reseller and an upstream seller for the same or other ticket transactions. In other words, a single or multiple smart contracts and electronic ledger records may be utilized to govern various aspects of a ticket sale or different transactions associated with a ticket sale in either upstream or downstream directions.

For example, an upstream seller may want to control or dynamically adjust the amount of commission due based on the downstream sales price or based on the downstream profit made by a reseller prior to the payment of the commission. By way of a non-limiting example, an upstream reseller may configure the executable program to result in the collection of an X % (e.g., 5%) commission, if the downstream pre-commission profit made by a downstream reseller is under a first value (e.g., $25), and the collection of a Y % (e.g., 10%) commission, if the downstream pre-commission profit is over the first value but less than a second value (e.g., $50), and the collection of a Z % (e.g., 15%) commission, if the pre-commission profit is over the second value, and so on.

Similarly, the commission amount may be waived or set to a nominal value, if the pre-commission profit made by the downstream seller is, for example, zero or below a certain threshold value. Other possible implementations and configurations for a fair or reasonable commission calculation protocol may be enforced in various embodiments. As another example, the executable program for commission calculation may be configured to take into consideration the status of a downstream seller or purchaser. For example, if the reseller or consumer falls in a certain category such as a protected class, a minority group, individuals with limited financial resources (e.g., students), or individuals of a certain age or disability, then amount of commission may be adjusted lower or waived.

Accordingly, various aspects and implementations of the claimed subject matter allow an upstream seller to have an adjustable level of control over the amount of commission paid by downstream resellers. The commission imposed may be in perpetuity or terminable after a certain number of transactions on the electronic ledger 101 or may be based on configurable factors and conditions that may be adjusted overtime as the timeline for attending or producing an event expires.

For example, the smart contracts or executable programs on the electronic ledger 101 may be configurable to reduce the amount of commission due if attendance for an event is projected to be lower than a first threshold at a first timeline (e.g., low demand), or alternatively may increase the amount of commission due if attendance to an event is projected to be higher than a second threshold at a second timeline (high demand), where the adjustments may be made incrementally over time and/or in real time as information about attendance is collected or becomes available.

By way of example and without limitation, the collected commission percentage for an event may be reduced by 1% (or $1) every 24 hours (or after every transaction), in response to determining that 90 days prior to the event less than 20% of the tickets (e.g., seats) are sold. And/or, the collected commission percentage for the same event may be increased by 1% (or $1) every 24 hours (or after every transaction), in response to determining that 30 days prior to the event less than 20% of the tickets are outstanding or remain available.

In certain implementation, the status of a ticket holder can be predicted by determining whether the current token owner is a consumer who plans to attend the event. For example, if the token owner has converted his demand token to an admission token, then it is likely that the token owner will be attending the event and does intend to resell the ticket token. Conversely, a token owner may be assumed to be a reseller, if the token owner has not converted his demand token to an admission token. Using statistical analysis, the commission values for downstream transactions may be adjusted, depending on the number of current token owners that are identified as having a consumer or reseller status.

By way of example and without limitation, if it is determined that more than 25% of the current token owners are resellers, then the commission due on the sale of a demand token may be reduced to promote further ticket sales to consumers, where the statistical analysis of the status of the token owners reflects low attendance demand for the event. Alternatively, if it is determined that less than 25% of the current token owners are resellers, then it can be assumed that there is high demand for attending the event, and the commission due on the sale of a demand token may be increased to maximize return and profit margin to the upstream sellers (e.g., the originating ticket agency, originating entity or producer).

Figure 3A:
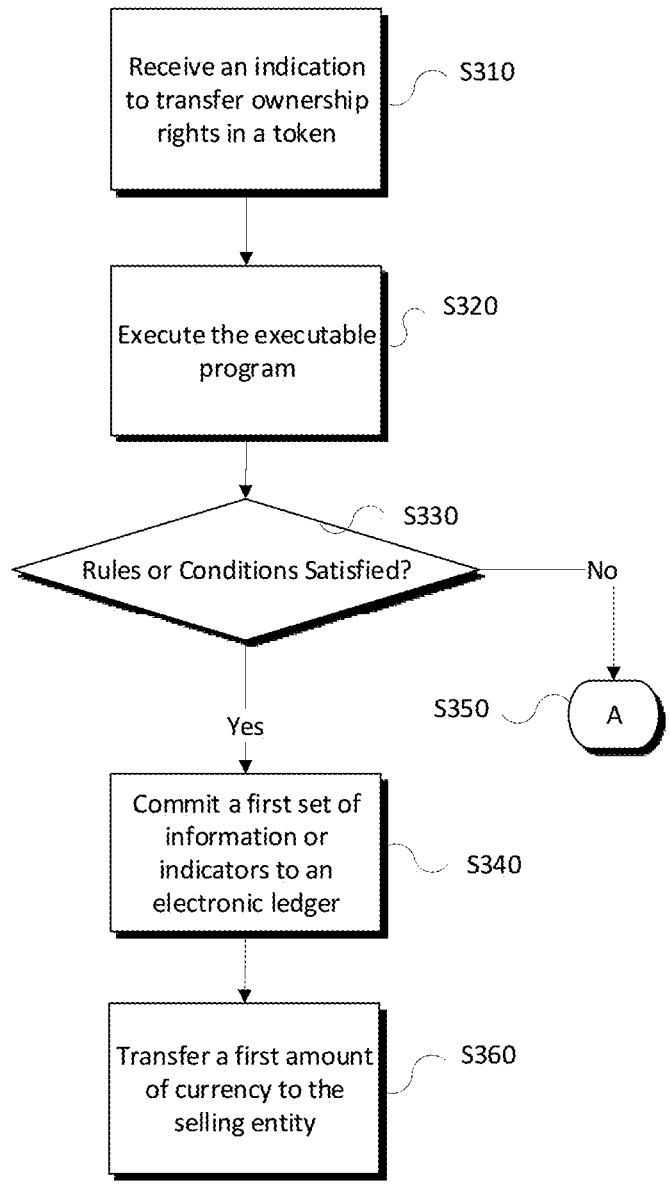
FIGS. 3A, 3B, and 3C are flow diagrams illustrating example processes for controlling ownership rights and verifying transactions recorded on one or more electronic ledgers, in accordance with one or more embodiments.

Referring to FIG. 3A, one or more nodes of an electronic ledger platform are enabled to carry out operations that provide for seamless control over ownership rights and privileges associated with an electronic token, as the token continues to be transferred in downstream commerce between various entities. For example, consider a scenario in which a first entity (e.g., a selling entity including or other than the originating entity) wishes to transfer ownership rights of an electronic token to a second entity (e.g., a purchasing entity). If the token is not associated with any privileges other than, for example, the right to attend an event, then the transfer of ownership may be facilitated based on the details provided earlier above.

The token may be issued with certain privileges. Examples of privilege include an applicable discount, a VIP status, a backstage pass, a prize, a fully refundable token, or any other added advantage beyond the right to own or transfer the token. In certain aspect, the originator may also define categories or classes of owners that would be entitled to one or more privileges attached to a token. For example, a 10% discount may be only available to a class of owners that are college students, a 20% discount may be only available to a class of owners that are high school students, a backstage pass may be available to a class of owners that are members of a fan club or use a certain source of funds (e.g., a specifically branded credit card) to purchase the token, and so on.

Accordingly, depending on whether a token is associated with certain privileges or not, additional steps or protocols may need to be followed in order to determine if the purchasing entity is entitled to certain privileges. By way of example, a token at the time of issuance may be embedded with data or metadata that identify the privileges associated with the token and/or identify classes, categories, or types of entities that would be entitled to certain privileges. An indication authorized by a selling entity to transfer ownership rights in the token to the purchasing entity may be submitted to and received by the electronic ledger as provided in further detail herein.

In one aspect, the indication includes a set of verifiable qualifications associated with the purchasing entity and the token includes at least one or more of a record of a first value (e.g., $100) associated with the token, a record of a set of restrictions associated with the token, and a reference to an executable program (e.g., smart contract). The restrictions may be based on rules and conditions (or references to rules and conditions) that are to be satisfied in order for the transfer of ownership for the token to be completed. In other words, if one or more rules or conditions are not satisfied, the transfer either fails or certain privileges are made unavailable to the purchasing entity.

Referring to FIGS. 1A and 3A, the content rights management system 25 may receive an indication to transfer ownership rights in a token (S310). An executable program (e.g., a smart contract) associated with electronic ledger 50 is executed, in response to receiving the indication (S320). The content rights management system 25 determines whether one or more of the rules or conditions are satisfied (S330). A rule or condition is deemed satisfied, for example, in response to determining that the purchasing entity is qualified for the ownership of the token or certain privileges based on an evaluation of the set of verifiable qualifications and restrictions. As provided herein, the verification of the qualifications may be assigned to an independent entity or a verification module (e.g., a witness entity 30) that authenticates the identity of the purchasing entity or the purchasing entity's status (e.g., membership in certain groups or classes).

Depending on the results of the verification, the smart contract determines whether the purchasing entity satisfies the indicated restrictions (e.g., a set of rules or conditions) and either approves, modifies, or denies the request for transfer of ownership. It is noteworthy that in some implementations the smart contract and the verification module may be combined such that the verification of the purchasing entity's qualifications and whether the restrictions (e.g., rules or conditions) are satisfied are performed by the same module. In other embodiments, two or more modules may be configured to separately verify the qualifications of a purchasing entity and validate the restrictions associate with a token and relay the results to a smart contract that is executing a token transaction.

Accordingly, if one or more of the rules and conditions are satisfied, a smart contract may commit a first set of information or indicators to one or more records of an electronic ledger (S340). If one or more rules and conditions are not satisfied, then the transfer fails or a second set of information or indicators are committed to one or more records of the electronic ledger (S350). The information and indicators committed to the electronic ledger may, for example, memorialize onto one or more records of the electronic ledger that the transfer of the token to the purchasing entity is confirmed, in exchange for currency corresponding to the first value (e.g., $100). Accordingly, a first amount of currency corresponding to the first value is transferred to the selling entity (S360).

Figure 3B:
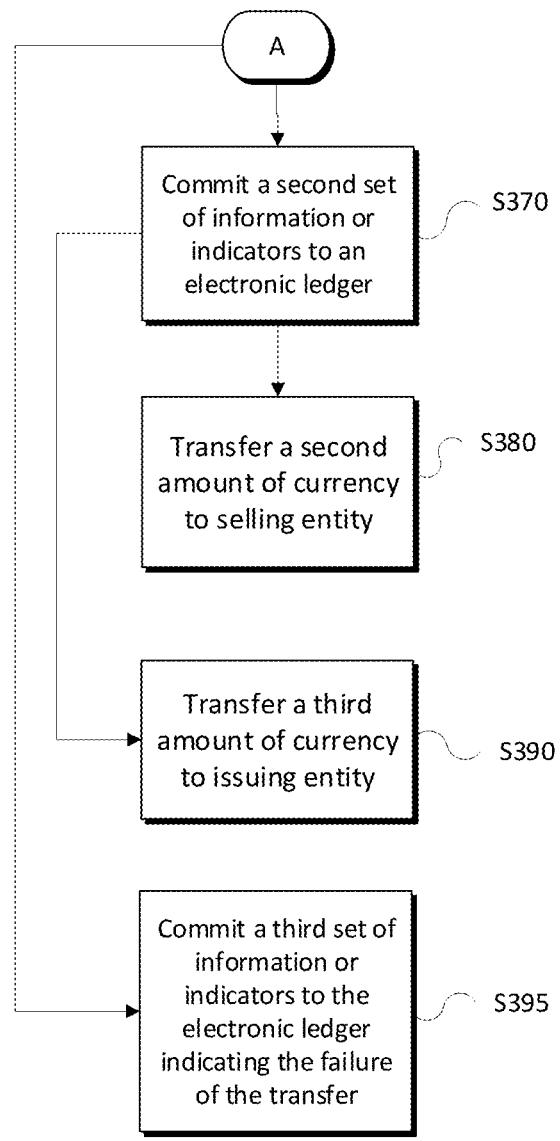

Referring to FIG. 3B, if the purchasing entity is not qualified for the ownership of the token based on the evaluation of the set of verifiable qualifications and the set of restrictions, the one or more rules or conditions may not be satisfied. If so, a second set of information or indicators may be committed to the electronic ledger (S370) to memorialize the same and also to indicate the token is to be transferred to the purchasing entity in exchange for currency corresponding to a second value (e.g., $200) higher than the first value (e.g., a discounted value of $150 for a student ticket). Accordingly, a second amount of currency corresponding to a first portion of the second value (e.g., $150) is transferred to the selling entity (S380) and a third amount of currency corresponding to a second portion of the second value (e.g., $50) is transferred to a third entity (e.g., an issuing entity) (S390). In this manner, the issuing entity recaptures any amount that was underpaid by the selling entity due to purchasing the ticket at a discounted value.

As noted earlier, in an example scenario, an executable program (e.g., a smart contract or other executable modules) may determine that the purchasing entity is not qualified for the ownership of the token based on the evaluation of the set of verifiable qualifications and the set of restrictions. If so, a third set of information or indicators may be committed to the electronic ledger indicating that the transfer of the token was unsuccessful (S395). In certain embodiments, the executable program fails to write the transaction to the electronic ledger or indicates the failure or rejection of the transaction by way of committing an error code to the one or more blocks of the electronic ledger.

In accordance with one or more embodiments, a smart contract determines the value to be paid by a purchasing entity based on the set of restrictions associated with the token or based on the set of verifiable qualifications associated with the purchasing entity. For example, the set of verifiable qualifications may indicate whether the purchasing entity is a member of a group or otherwise identify the purchasing entity as being a member of a class that is entitled to one or more privileges associated with the token being transferred. As provided earlier, the purchasing entity may be determined as not qualified for the ownership of the token, if it is determined that a characteristic associated with the purchasing entity violates a restriction in the set of restrictions. For example, where a restriction is for the token to be only transferred to a student, if the purchasing entity is not verified as being a student, then the transfer of the token fails, or the purchasing entity will have to pay a higher price for the token (e.g., $200 regular price vs. $150 student discounted price). In one embodiment, as provided earlier, the additional payment may be recaptured by the issuing entity (or other upstream seller).

As another example, the set of verifiable qualifications for a purchasing entity may indicate a characteristic for the purchasing entity that would disqualify the purchasing entity from utilizing a privilege associated with the ownership of the token. This may be in response to determining that the characteristic of the purchasing entity violates a restriction. If so, the purchasing entity may purchase the token at a certain value but would not be able to take advantage of the associated privileges. For example, a token may be associated with VIP privileges if sold to a purchasing entity that is a member of a fan club. If the purchasing entity cannot be verified as a member of the fan club, then the particular privilege associated with the token will not be activated for the purchasing entity.

It is noteworthy that where the privilege associated with the ownership of the token is associated with access to one or more resources (e.g., an early admission, discounted parking, back-stage pass, privileged entry, privileged seat assignment, complementary consumables, etc.), the purchasing entity may qualify for one set of privileges and be excluded from others, depending on the verifiable characteristics associated with the purchasing entity as verified by a verification module. For example, the verification module may determine that the purchasing entity is a member of a Fan Club A who is entitled to certain privileges A1, A2 and A3 associated with the token being transferred, but that the purchasing entity is not entitled to privileges B1 and B2 available to a member of Fan Club B.

Accordingly, in certain implementations, privileges associated with a token may be turned on or off at the time of transfer of ownership to add or remove access to one or more privileges tied to the token at the time of issuance. In some aspects, a privilege may be added to a token even if it was not associated with the token at the time of issuance. In other aspects, a token may become non-transferable or be invalidated, in response to determining that a characteristic of the purchasing entity violates a restriction or fails validation.

Figure 3C:
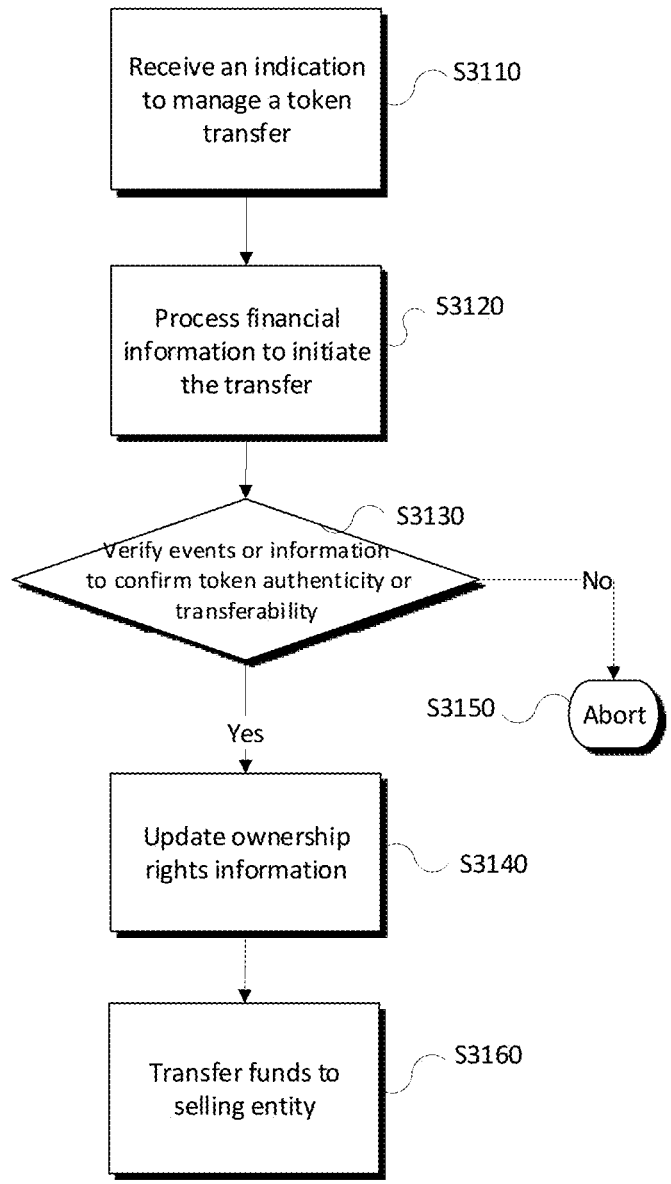

Referring to FIGS. 1A and 3C, an electronic token transaction on monetary transaction system 15 is fulfilled conditioned upon the transfer of ownership rights in the electronic token as recorded by the contents right management system 25 on electronic ledger 50. In accordance with one or more embodiments, the monetary transaction system 15 receives an indication from a smart contract on electronic ledger 40 to manage a token transfer or a transaction associated with the purchase or sale of a token recorded on electronic ledger 50 (S3110). The monetary transaction system 15 processes a first set of information associated with the purchase or sale of the token to initiate the transfer of the token (S3120). The first set of information may include financial information, without limitation, a value associated with the token, a source of funds for the purchase, and a destination account for transfer of currency from the source of funds.

To confirm authenticity or transferability of the token, at least one witness entity 30 verifies one or more events or a second set of information associated with the transaction (S3130). The second set of information may include, for example, electronically verifiable ID tokens associated with the selling entity (e.g., unique identifiers such an email address, a device identifier, or a communication path) or an authenticity or reliability score calculated for the selling entity (e.g., based on past transactions or credit bureau data). The witness entity 30 may detect the transfer of ownership rights in the token based on, for example, an indication that certain events associated with the transfer requests have occurred. If the verification is successful, information about the ownership rights to the token are updated on electronic ledger 50 by the contents right management system 25 (S3140).

If witness entity 30 cannot verify the authenticity or transferability of the token offered for sale, the transaction is aborted (S3150). As noted earlier, witness entity 30 is configured to confirm the transfer of ownership rights in operating environment 10, for example, when electronic ledger 40 and the monetary transaction system 15 are not integrated with the content rights management 25 and electronic ledger 50. In such scenario, the monetary transaction system 15 is unable to directly access data recorded in one or more records of the electronic ledger 50 and cannot independently verify the transfer of content rights in the token.

In response to witness entity 30 verifying the authenticity and transferability of the token, the monetary transaction system 15 completes the transaction and transfers the funds for the purchase of the token to the selling entity (e.g., by transferring the funds from a source of funds to a destination account) (S3160). The information associated with the transaction may include at least one of a delivery instrument, a proof of delivery, or a proof of initiation of shipment. The one or more events may include at least one of initiation of transfer of the ownership rights in the token to the purchasing entity, delivery of the token to the purchasing entity, or an attempt for delivery of the token by the selling entity.

Depending on implementation, confirming of the authenticity or transferability of the token may include confirming that the first entity and the second entity are the same. In response to successfully verifying at least one or more of the authenticity or transferability of the token, a smart contract is executed to update information about the ownership rights to the token. Information about ownership rights is committed to one or more records of at least one or more of (1) a first electronic ledger associate with the first electronic ledger platform utilized for managing the exchange of consideration paid for the transaction and (2) a second electronic ledger associate with a second electronic ledger platform (e.g., a content rights management system) utilized for managing the ownership rights to the token.

The transaction may be verified, in response to a witness entity verifying one or more of the authenticity or the transferability of the token. Information associated with verifying the authenticity or the transferability of the token includes at least one of data about the owner of the token, electronically verifiable ID tokens associated with the selling entity, such as unique identifiers for devices used by the selling entity, an authenticity or reliability score calculated for the selling entity. Other related information such as the event time and location, the seat selection, the face value of the ticket, seat attributes such as aisle or handicapped-accessible, prior sales prices, attributes of the first party, second party, or third-party, such as past purchases, fan club status, or loyalty tier may be also considered.

As shown in FIG. 1A, validation and fulfillment system may be also implemented to monitor and verify one or more information or events confirming, supporting, or signifying the transfer (or initiation of the transfer) of an electronic ticket to a purchaser before the funds are transferred from the purchaser to the seller. An electronic token for a ticket may be initially issued with metadata embedded in (or otherwise associated) with the token. The metadata can be evaluated by a smart contract on electronic ledger 50, for example, to ensure a seller is a legitimate content rights owner (e.g., a rightful owner of the ticket being sold).

The information associated with the transaction may include at least one of a delivery instrument, a proof of delivery, or a proof of initiation of shipment. and the one or more events include at least one of initiation of transfer of the ownership rights in the token to the purchasing entity, delivery of the token to the purchasing entity, or an attempt for delivery of the token by the selling entity. In one embodiment, the monetary transaction system 15 is configured to find one or more witness entities 30 that can be used to verify an event has occurred, where the event indicates the ownership rights to the sold ticket have been or are being transferred to the purchaser of the ticket. If a witness entity 30 is identifiable and can successfully perform the verification, then the monetary transaction system 15 is notified and processes the ticket sale transaction.

The verification process may be based on a series of electronic functions. For example, before the payment transaction to the seller is completed, certain details (e.g., tokenized metadata) about the ticket are sent to a selected witness entity 30 by the content rights management system 25. The selection of witness entity 30, in one aspect, is either randomized or is based on predetermined factors (e.g., the amount charged by witness entity 30 for providing the verification service, the efficiency or the reputation of the witness entity, etc.). Witness entity 30 upon receiving the details uses the related information (e.g., the metadata) to verify that the ticket has been routed or sent to the purchaser, whether physically or electronically.

The details verified by witness entity 30 may include, by way of example, a tracking number (e.g., FedEx tracking #) electronically issued by a delivery service or system. In some embodiments, instead of or in addition to the tracking number, witness entity 30 may electronically receive (or may be able to electronically retrieve) other information to confirm the occurrence of an event (e.g., when the ticket is delivered to the purchaser or when a record in a content rights ledger has been updated to reflect change of ownership of the ticket). Such verification may be based on electronic data (e.g., an instrument signed by a delivery agent) recorded on electronic ledger 50, or electronic notifications forwarded by the content rights management system 25 to the witness entity that indicate certain delivery events have been completed (e.g., the ticket has been shipped, or the ownership rights have been transferred).

Witness entity 30 thus verifies the proper delivery instrument or the occurrence of certain expected events and notifies a smart contract (e.g., executed on the monetary transaction system) to help complete the financial transaction between the purchaser and the seller, based on which the seller is paid. Witness entity 30 may approve an initial partial payment to the seller so that a transaction may be quickly processed and recorded on the monetary transaction system electronic ledger 40. One or more secondary payments may be made later upon the confirmation of the transfer of rights as recorded on the content rights management electronic ledger 50. Witness entity 30 may be also configured to notify the content rights management system to take the needed steps to update the ownership records on the electronic ledger 50 to reflect the ticket sale or the transfer of ownership rights to the purchaser.

One or more smart contracts for managing the transfer of rights, or for monitoring the transaction between a purchaser and a seller, may be executed over the monetary transaction system 15, the content rights management system 25, or on an independently operated computing system (e.g., a dedicated transaction or rights management server). The smart contract may use token metadata associated with a ticket to approve or prevent the transfer of a ticket if a seller or a purchaser is deemed unqualified or unidentifiable. As such, the transaction may not be approved or completed if witness entity 30 cannot confirm the requisite qualifications or identities, or if certain events that establish ownership or delivery cannot be verified.

In one embodiment, when an electronic ticket sale is managed over an unintegrated monetary transaction system 15, escrow requirements are completed with a witness transaction process or approved by a witness entity 30, where the details of the sale are recorded on a distributed electronic ledger 40 managed by the monetary transaction system 15. Depending on implementation, certain metadata may be recorded on the electronic ledger 40 to memorialize the transaction. The metadata may include, without limitation, information about the asset for sale, seller identity, purchaser identity, remuneration paid by the seller to the purchaser for the transaction.

After the transaction is recorded on electronic ledger 40, the seller initiates transfer of the asset (e.g., an electronic ticket). An event that confirms the purchaser has received the asset may be also recorded on electronic ledger 40. A witness entity 30 is used to record an assertion to the electronic ledger 50 and verify the completion of the transaction by, for example, confirming a delivery instrument or detecting or identifying occurrence of certain events. Such events can include the initiation of a ticket transfer, an attempt to deliver the purchased ticket, or the delivery of the ticket.

The verification of the example events noted above may be done by way of witness entity 30 receiving one or more notifications from a delivery service. Alternatively, witness entity 30 may access records available on the electronic ledger 50 associated with the content rights management system 25 through, for example, an application programming interface (API) or other intervening electronic platform used for detecting and processing certain expected events or instruments of delivery.

Witness entity 30 may be implemented on a computing system associated with a party to the transaction, the marketplace facilitating the transaction, the original content rights holder or primary issuer, or an independent third party service provider. Witness entity 30 may receive remuneration as a reward for providing the verification and validation services or fulfilling the underlying transactions. Notably, one or more qualified witness entities 30 may be specified by a smart contract initiating the transaction. The smart contract may also allow that the sale agreement contain or record a list of acceptable or qualified witness entities 30 as provided by either the purchaser or seller or based on the amount of the transaction.

Figure 4:
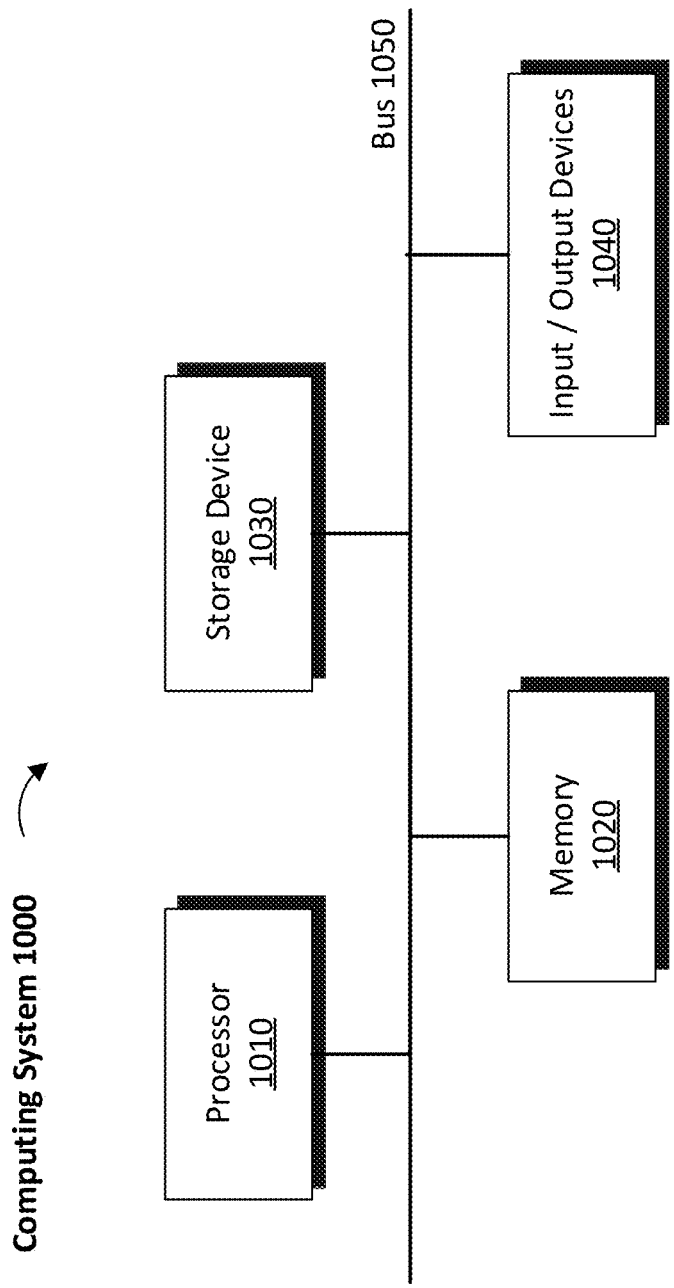
FIG. 4 is a block diagram of a computing system that may be utilized to perform one or more computer processes disclosed herein as consistent with the disclosed embodiments.

Referring to FIG. 4, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 4, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

Terminology and definitions for certain terminology as applicable to one or more embodiments disclosed herein are provided below for the purpose of clarity and context but without the intention to unduly limit the scope of the claimed subject matter to any specific examples or details.

As used herein, a primary issuer is a party who first sells a particular ticket. Face value is the price paid for a ticket upon initial sale. Transfer price is the price paid for a ticket upon initial sale or a subsequent sale. Attendance price is the price paid by the party who attends the event. Resale commission is a commission paid upon resale of a ticket.

A token refers to a digital asset representing ownership or other interest rights. In this context and as provided in further detail below, a token may be transferred between parties who may have an interest in buying, selling or transferring admission rights to an event or venue. A content rights holder refers to one or more producers of an event, who initially own and control the rights to attend the event or venue. In this context, admission or admitting refers to the act of allowing one or more people to attend an event by validating their right to attend.

A demand token refers to a token representing the right to demand an asset from another party. In this context, a demand token may represent ownership rights and more particularly the right to demand a ticket, ticket token, or admission token from one or more parties or entities participating in a token exchange. An admission token, in contrast, may be a token that represents the right to attend an event. An admission token essentially would be the digital equivalent to a printed ticket. A ticket, as used herein, may refer to either a demand token or an admission token.

An admission token is a bearer instrument (e.g., a physical token such as a paper ticket, or a digital token such as a scannable or printable indicia or ticket) that allows admission to an event, a venue, and in some circumstances may also represent the right to attend or own a tangible or non-tangible asset, whether fungible or non-fungible. A demand token is a digital token representing the ownership of a ticket. A zone ticket refers to the obligation for a seller to provide a ticket to a purchaser in a certain section or with certain qualities. Seat license rights refer to the rights to purchase tickets for an event.

Depending on implementation, an admission token may be structured as one or more of the following:
  A demand token in a non-transferable state recorded in a first electronic ledger,
  A non-transferable token recorded in the first electronic ledger in which a corresponding demand token is recorded,
  A non-transferable token recorded in a second electronic ledger other than the first electronic ledger in which the corresponding demand token is recorded, or
  A token or identifier in a legacy computing system implemented to correspond to a respective demand token in the first electronic ledger.

Originator or originating entity refers to the owners or producers of an event (or media) who offer the tickets and the related tokens for sale to either (1) the public (e.g., the consumers) or (2) resellers (e.g., those who intend to resell the tickets) to the public, for example, over an electronic ledger platform or other online environment. Originating agent refers to an agent (e.g., an exclusively contracted ticket agency) of the owners or producers who offer the tickets and the related tokens for sale to the public or resellers.

The terms "upstream," "midstream," and "downstream" refer to points in time when a ticket or token is exchanged or sold. Within the context of the sale of a ticket in the stream of commerce, an upstream entity is a party who sells a ticket to a midstream entity, who in turn resells the ticket to a downstream entity. Depending on the nature of the transaction and the point in time within a designated or observed timeline, an entity may be considered to be an upstream, midstream, or downstream seller (or purchaser) in relation to other entities in the exchange.

In certain embodiments, an electronic ledger is used to record a list of changes to a set of data that represent purchases of items, transfers of ownership, or any other changes in data records. A digital signature of a data record may be a cryptographic technique that allows a verifying entity to strongly trust that the data record was generated or certified by a specific party. A digital signature may be applied to individual data records or collections of records, in certain implementations.

A distributed electronic ledger as used herein refers to an electronic ledger where different parts of the ledger are stored in different systems, often but not necessarily owned by different parties. A distributed ledger may be partitioned by record, by field, or a combination of the two. A blockchain may be a transactional or distributed ledger trusted by digital signatures that certify the content and/or sequence within the ledger. Individual records may also be certified through digital signatures by other parties. Although "blockchain" and "electronic ledger" are sometimes used interchangeably in this description, a blockchain is just one type of electronic ledger, and the techniques described here can be used just as effectively with other types of electronic ledgers.

Consensus refers to a mechanism or protocol that allows multiple parties to agree on the content of a block in a blockchain or distributed ledger. Proof of Work and Proof of Stake are examples of consensus mechanisms that may be utilized in accordance with one or more embodiments to verify transactions on a blockchain.

One or more electronic ledgers may be implemented to include or interface with smart contracts in the form of computing engines. A smart contract may be an executable program with a set of business logic that governs valid entries in an electronic ledger. In some embodiments, a smart contract may be registered or distributed within a blockchain, multi-chain or any type of electronic ledger, so that participants can validate or execute steps defined in the contract.

A smart contract refers to a set of business logic that governs valid entries in an electronic ledger. In some embodiments, a smart contract may be registered or distributed within a blockchain so that participants can validate or execute steps defined in the contract. Consensus refers to a mechanism or protocol that allows multiple parties to agree on the content of a block in a blockchain or distributed ledger. Proof of Work and Proof of Stake are examples of consensus mechanisms that may be utilized in accordance with one or more embodiments to verify transactions on a blockchain.

A smart contract may be utilized to, for example, allow the performance of credible (e.g., trackable and irreversible) transactions without involving a centralized managing party. The transactions may be processed by serverless microservice engines (e.g., Lambdas or other decentralized infrastructure) on a distributed ledger platform. To enable financial transactions, in certain embodiments, tokens (e.g., personal trading units) are utilized to monetize digital transactions without the need for a centralized institution (e.g., a bank).

In some example embodiments, a smart contract is a digital promise entailing rights and duties voluntarily agreed by the parties to a contract configured to digitally facilitate, verify, or enforce the negotiation or performance of an agreement between the parties. In one embodiment, the smart contract may be implemented based on a combination of protocols with user interfaces to formalize and secure relationships over computer networks, using cryptographic and other security mechanisms.

A consistent audit trail of transactions, exchanges and activities may be maintained by way of using an electronic ledger, which may be implemented as a publicly accessible message queue with an immutable database. Examples of computing platforms that may be used to implement a distributed ledger may include a blockchain, a hashgraph, or other computing data structures implemented based on a growing list of N associated records or data blocks in a blockchain.

A data block may be logically linked to another block (e.g., a previous block) in a distributed ledger based on a cryptographic hash of the content of the other block. A data block may also include a timestamp or transaction data. Further, a data block in a distributed ledger may be implemented to be immutable (e.g., resistant to modification of the data stored within the block). The immutable nature of the data block and the acceptance of a set of rules and policies by the users (or the implementers) of the distributed ledger platform provides for high levels of confidence in the data stored and processed by the distributed ledger because a singular central entity is not solely in control.

One or more distributed ledgers may be implemented to include or interface with smart contracts in the form of computing engines. A smart contract may be a digital promise entailing rights and duties voluntarily agreed by the parties to a contract configured to digitally facilitate, verify, or enforce the negotiation or performance of an agreement between the parties. In one embodiment, the smart contract may be implemented based on a combination of protocols with user interfaces to formalize and secure relationships over computer networks, using cryptographic and other security mechanisms.

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

Copyright & Trademark Notices

A portion of the disclosure of this patent document may contain material, which is subject to copyright protection. The applicant has no objection to the reproduction of the patent documents or the patent disclosure as it appears in the Patent and Trademark Office patent files or records but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. An electronic ledger platform for processing electronic tokens transferable between multiple entities, the multiple entities including a first entity, a second entity, and a third entity, the electronic ledger platform comprising:
    an issuing system for writing a demand token to one or more blocks of an electronic ledger in the electronic ledger platform, the demand token including or referencing ownership information and activity information, the ownership information indicating that the demand token is owned by the second entity, and the activity information indicating an event to which the second entity is admissible, if the second entity converts the demand token to an admission token, the ownership of the demand token being transferred from the second entity to the third entity over the electronic ledger platform in accordance with a first protocol;
    an admission system, independent of the issuing system, for converting the demand token to the admission token, in response to an authenticated request by the second entity, the admission token redeemable at a time of entry to the event in accordance with a second protocol, the first protocol requiring a first level of scrutiny at a higher level of confidence than the second protocol; and
    a transaction system for transferring the demand token from the second entity to the third entity in exchange for a first quantity of currency to be provided to the second entity by the third entity, the demand token including a reference to an executable program that is executed to commit to one or more blocks of the electronic ledger at least a reference to the transfer of the demand token to the third entity,
    wherein the first protocol is configured for verifying the ownership information associated with the demand token and validating each transaction for transfer of the demand token over the electronic ledger, and
    wherein the second protocol is configured for redeeming the admission token independent of the first protocol configured for verifying the ownership information associated with the demand token without validating each transaction for transfer of the demand token over the electronic ledger.

2. The electronic ledger platform of claim 1, wherein the executable program when executed further commits to one or more blocks of the electronic ledger at least a reference to a transfer of a first of the first quantity of the currency to the first entity, wherein the first portion is determined based on the first quantity and a second quantity, the second quantity representing value paid by the second entity to the first entity in exchange for the demand token.

3. The electronic ledger platform of claim 1, wherein the second protocol is configured for redeeming the admission token independent of the first protocol configured for verifying the ownership information associated with the demand token.

4. The electronic ledger platform of claim 1, wherein the demand token further comprises a third quantity of the currency configured to be provided to the first entity upon an initial transfer of the demand token.

5. The electronic ledger platform of claim 1, wherein the exchange for a first quantity of currency is authorized by the third entity.

6. The electronic ledger platform of claim 2, wherein the first portion is determined based on a percentage of a difference between the second quantity and the first quantity.

7. The electronic ledger platform of claim 1, wherein the transfer of the demand token to the third entity is committed in a first record of the electronic ledger.

8. The electronic ledger platform of claim 2, wherein the transfer of the first portion of the first quantity of the currency to the first entity is committed in a second record of the electronic ledger.

9. The electronic ledger platform of claim 2, wherein the transfer of the demand token to the third entity and the transfer of the first portion of the first quantity of the currency to the first entity are committed in a first record of the electronic ledger.

10. The electronic ledger platform of claim 6, wherein the third entity determines a value associated with the percentage.

11. The electronic ledger platform of claim 2, wherein the third entity determines a value associated with the first portion.

12. The electronic ledger platform of claim 2, wherein a value of the first portion is zero, in response to determining that a difference between the second quantity and the first quantity is less than a predetermined threshold.

13. The electronic ledger platform of claim 2, wherein a value of the first portion is less than or equal to a first threshold, in response to determining that a difference between the second quantity and the first quantity is less than a second predetermined threshold.

14. A computer program product comprising a non-transitory machine-readable medium storing instructions that, when executed by at least one programmable processor, cause the at least one programmable processor to perform operations comprising:
- writing, by an issuing system, a demand token to one or more blocks of an electronic ledger in an electronic ledger platform, the demand token including or referencing ownership information and activity information, the ownership information indicating that the demand token is owned by a first entity, and the activity information indicating an event to which the first entity is admissible, if the first entity converts the demand token to an admission token, the ownership of the demand token being transferred from the first entity to a second entity over the electronic ledger platform in accordance with a first protocol;
- the demand token being convertible to the admission token, in response to an authenticated request by the first entity, by an admission system, independent of the issuing system, the admission token redeemable at a time of entry to the event in accordance with a second protocol, the first protocol requiring a first level of scrutiny at a higher level of confidence than the second protocol; and
- the demand token being transferable, by a transaction system, from the first entity to the second entity in exchange for a first quantity of currency provided to the first entity by the second entity, the demand token including a reference to an executable program that is executed to commit to one or more blocks of the electronic ledger at least a reference to the transfer of the demand token to the second entity,
- wherein the first protocol is configured for verifying the ownership information associated with the demand token and validating each transaction for transfer of the demand token over the electronic ledger, and
- wherein the second protocol is configured for redeeming the admission token independent of the first protocol configured for verifying the ownership information associated with the demand token without validating each transaction for transfer of the demand token over the electronic ledger.

15. A computer-implemented method comprising:
- writing, by an issuing system, a demand token to one or more blocks of an electronic ledger in an electronic ledger platform, the demand token including or referencing ownership information and activity information, the ownership information indicating that the demand token is owned by a first entity, and the activity information indicating an event to which the first entity is admissible, if the first entity converts the demand token to an admission token, the ownership of the demand token being transferred from the first entity to a second entity over the electronic ledger platform in accordance with a first protocol;
- the demand token being convertible to the admission token, in response to an authenticated request by the first entity, by an admission system, independent of the issuing system, the admission token redeemable at a time of entry to the event in accordance with a second protocol, the first protocol requiring a first level of scrutiny at a higher level of confidence than the second protocol; and
- the demand token being transferable, by a transaction system for from the first entity to the second entity in exchange for a first quantity of currency provided to the first entity by the second entity, the demand token including a reference to an executable program that is executed to commit to one or more blocks of the electronic ledger at least a reference to the transfer of the demand token to the second entity,
- wherein the first protocol is configured for verifying the ownership information associated with the demand token and validating each transaction for transfer of the demand token over the electronic ledger, and
- wherein the second protocol is configured for redeeming the admission token independent of the first protocol configured for verifying the ownership information associated with the demand token without validating each transaction for transfer of the demand token over the electronic ledger.

16. An electronic ledger platform for processing electronic tokens transferable between multiple entities, the multiple entities including a first entity, a second entity, and a third entity, the electronic ledger platform comprising:
- an issuing system for writing a demand token to one or more blocks of an electronic ledger in the electronic ledger platform, the demand token including or referencing ownership information and activity information, a record of at least one of a first value associated with the demand token, a record of a set of restrictions associated with the demand token, and a reference to an executable program, the ownership information indicating that the demand token is owned by the second entity, and the activity information indicating an event to which the second entity is admissible, if the second entity converts the demand token to an admission token, the ownership of the demand token being transferred from the second entity to the third entity over the electronic ledger platform in accordance with a first protocol;
- an admission system, independent of the issuing system, for converting the demand token to the admission token, in response to an authenticated request by the second entity, the admission token redeemable at a time of entry to the event in accordance with a second protocol, the first protocol requiring a first level of scrutiny at a higher level of confidence than the second protocol, the authenticated request further comprising a set of verifiable qualifications associated with the second entity;

a transaction system for, based in response to execution of the executable program, committing to one or more records of the electronic ledger: an indication of the transfer of the demand token from the second entity to the third entity in exchange for a first currency, when the second entity is qualified for the ownership of the demand token based on an evaluation of the set of verifiable qualifications and the set of restrictions, wherein a first amount of currency corresponding to the first value is transferred to the second entity, an indication of the transfer of the demand token from the second entity to the third entity in exchange for the first currency corresponding to a second value higher than the first value, when the third entity is not qualified for the ownership of the demand token based on the evaluation of the set of verifiable qualifications and the set of restrictions, wherein a second amount of currency corresponding to a first portion of the second value is transferred to the second entity and a third amount of currency corresponding to a second portion of the second value is transferred to a fourth entity; or an indication that the transfer of the demand token was unsuccessful, in response to determining that the third entity is not qualified for the ownership of the token based on the evaluation of the set of verifiable qualifications and the set of restrictions, wherein the first protocol is configured for verifying the ownership information associated with the demand token and validating each transaction for transfer of the demand token over the electronic ledger, and wherein the second protocol is configured for redeeming the admission token independent of the first protocol configured for verifying the ownership information associated with the demand token without validating each transaction for transfer of the demand token over the electronic ledger.

17. An electronic ledger platform for processing electronic tokens transferable between multiple entities, the multiple entities including a first entity, a second entity, and a third entity, the electronic ledger platform comprising:

an issuing system for writing a demand token to one or more blocks of an electronic ledger in the electronic ledger platform, the demand token including or referencing ownership information and activity information, the ownership information indicating that the demand token is owned by the second entity, and the activity information indicating an event to which the second entity is admissible, if the second entity converts the demand token to an admission token, the ownership of the demand token being transferred from the second entity to the third entity over the electronic ledger platform in accordance with a first protocol;

an admission system, independent of the issuing system, for converting the demand token to the admission token, in response to an authenticated request by the second entity, the admission token redeemable at a time of entry to the event in accordance with a second protocol, the first protocol requiring a first level of scrutiny at a higher level of confidence than the second protocol;

a transaction system to confirm transfer of the demand token from the second entity to the third entity by verifying one or more events or information associated with purchase of the demand token by the third entity from the second entity, wherein the first protocol is configured for verifying the ownership information associated with the demand token and validating each transaction for transfer of the demand token over the electronic ledger, and wherein the second protocol is configured for redeeming the admission token independent of the first protocol configured for verifying the ownership information associated with the demand token without validating each transaction for transfer of the demand token over the electronic ledger.

18. An electronic ledger platform for processing electronic tokens transferable between multiple entities, the multiple entities including a first entity, a second entity, and a third entity, the electronic ledger platform comprising:

an issuing system for writing a demand token to one or more blocks of an electronic ledger in the electronic ledger platform, the demand token including or referencing ownership information and activity information, the ownership information indicating that the demand token is owned by the second entity, and the activity information indicating an event to which the second entity is admissible, if the second entity converts the demand token to an admission token, the ownership of the demand token being transferred from the second entity to the third entity over the electronic ledger platform in accordance with a first protocol;

an admission system, independent of the issuing system, for converting the demand token to the admission token, in response to an authenticated request by the second entity, the admission token redeemable at a time of entry to the event in accordance with a second protocol, the first protocol requiring a first level of scrutiny at a higher level of confidence than the second protocol;

a transaction system to manage a transaction associated with a sale of the demand token from the second entity to the third entity, the transaction system configured to: receive an indication from a smart contract to manage the transaction, process information associated with the sale of the demand token to initiate the transaction, the information including identity of the second entity listing the token for sale and the identity of the third entity having record ownership of the token, verify one or more events or information associated with the transaction to confirm authenticity or transferability of the demand token; and approve the transaction, wherein the first protocol is configured for verifying the ownership information associated with the demand token and validating each transaction for transfer of the demand token over the electronic ledger, and wherein the second protocol is configured for redeeming the admission token independent of the first protocol configured for verifying the ownership information associated with the demand token without validating each transaction for transfer of the demand token over the electronic ledger.

* * * * *